US 11,982,888 B2

(12) United States Patent
Motoji et al.

(10) Patent No.: US 11,982,888 B2
(45) Date of Patent: May 14, 2024

(54) NONRECIPROCAL WAVEGUIDE, ISOLATOR, OPTICAL SWITCH, OPTICAL TRANSCEIVER, DATA CENTER, AND MANUFACTURING METHOD

(71) Applicant: KYOCERA Corporation, Kyoto (JP)

(72) Inventors: Reona Motoji, Yokohama (JP); Tomoya Sugita, Machida (JP)

(73) Assignee: KYOCERA Corporation, Kyoto (JP)

( * ) Notice: Subject to any disclaimer, the term of this patent is extended or adjusted under 35 U.S.C. 154(b) by 37 days.

(21) Appl. No.: 17/804,261

(22) Filed: May 26, 2022

(65) Prior Publication Data
US 2022/0382084 A1    Dec. 1, 2022

(30) Foreign Application Priority Data
May 27, 2021    (JP) .................................. 2021-089448

(51) Int. Cl.
*G02F 1/095*    (2006.01)
*G02B 6/12*     (2006.01)
(Continued)

(52) U.S. Cl.
CPC .......... *G02F 1/0955* (2013.01); *G02B 6/2746* (2013.01); *G02F 1/093* (2013.01); *G02B 2006/12157* (2013.01)

(58) Field of Classification Search
CPC .... G02F 1/0036; G02F 1/0072; G02F 1/0082; G02F 1/093; G02B 6/2746; G02B 2006/12157; G01F 1/1034
See application file for complete search history.

(56) References Cited

U.S. PATENT DOCUMENTS 9,170,440 B2 * 10/2015 Yoshie .................. G02F 1/0955
2010/0002988 A1 * 1/2010 Yoshie .................. G02B 6/122
385/11
(Continued)

FOREIGN PATENT DOCUMENTS

CN    101261372 A  *  9/2008
CN    112711147 A  *  4/2021 ........... G02B 6/2746
(Continued)

OTHER PUBLICATIONS

Ishida et al. ("Amorphous-Si waveguide on a garnet magneto-optical isolator with a TE mode nonreciprocal phase shift"; Optics Express, vol. 25, No. 1, Jan. 9, 2017, pp. 452-462) (Year: 2017).*
(Continued)

*Primary Examiner* — Michelle R Connelly
(74) *Attorney, Agent, or Firm* — Studebaker & Brackett PC

(57) ABSTRACT

A nonreciprocal waveguide includes a substrate, a light propagation path, a magnetic member, an insulating layer, and a mask. The light propagation path is positioned at the substrate along a substrate surface. The magnetic member is positioned at the substrate along part of the light propagation path in a longitudinal direction. The insulating layer is positioned at the substrate and contains the light propagation path and the magnetic member. Inside the insulating layer, the mask is positioned further away than the light propagation path from the substrate. As seen from a direction perpendicular to the substrate surface, the mask overlaps at least part of the light propagation path in a width direction from a side of the light propagation path opposite to the magnetic member in the width direction. The mask is positioned in at least a range in which the magnetic member is positioned in the longitudinal direction.

20 Claims, 38 Drawing Sheets

(51) Int. Cl.
*G02B 6/27* (2006.01)
*G02F 1/09* (2006.01)

(56) References Cited

U.S. PATENT DOCUMENTS

| | | | | |
|---|---|---|---|---|
| 2011/0311181 | A1* | 12/2011 | Yoshie | G02B 6/122 |
| | | | | 385/14 |
| 2013/0016943 | A1* | 1/2013 | Yoshie | G02B 6/122 |
| | | | | 385/14 |
| 2016/0341981 | A1* | 11/2016 | Carroll | G02B 6/2746 |
| 2020/0363584 | A1* | 11/2020 | Matsui | G02B 27/28 |
| 2022/0026748 | A1* | 1/2022 | Matsui | G02B 6/125 |
| 2022/0206325 | A1* | 6/2022 | Yoshikawa | H01S 5/0239 |
| 2022/0260867 | A1* | 8/2022 | Yoshikawa | G02B 6/27 |

FOREIGN PATENT DOCUMENTS

| | | | | |
|---|---|---|---|---|
| CN | 112764247 | A * | 5/2021 | |
| CN | 113826041 | A * | 12/2021 | G02B 6/2746 |
| JP | S61-159737 | A | 7/1986 | |
| JP | H0310212 | A * | 1/1991 | |
| JP | 2010123688 | A * | 6/2010 | |
| JP | 4807404 | B2 * | 11/2011 | |
| JP | 2015169833 | A * | 9/2015 | |
| JP | 2020134845 | A * | 8/2020 | |
| JP | 2020181111 | A * | 11/2020 | G02B 6/2746 |

OTHER PUBLICATIONS

Mizumoto et al. ("Silicon waveguide optical nonreciprocal devices based on magneto-optical phase shift", Proceedings of SPIE vol. 8988, 89880C, SPIE Opto, 2014, San Francisco, California, United States) (Year: 2014).*

* cited by examiner

NONRECIPROCAL WAVEGUIDE, ISOLATOR, OPTICAL SWITCH, OPTICAL TRANSCEIVER, DATA CENTER, AND MANUFACTURING METHOD

CROSS REFERENCES TO RELATED APPLICATIONS

The present application claims priority to Japanese Patent Application No. 2021-089448 filed in the Japan Patent Office on May 27, 2021, the entire contents of which are incorporated herein by reference.

BACKGROUND OF THE INVENTION

1. Field of the Invention

The present invention relates to a nonreciprocal waveguide, an isolator, an optical switch, an optical transceiver, a data center, and a manufacturing method.

2. Description of the Related Art

Consideration is being made of forming a nonreciprocal waveguide on a semiconductor substrate. Since other structural elements are stacked upon the semiconductor substrate, an insulating film is deposited up to a relatively high position from the substrate. In order to form the nonreciprocal waveguide on the semiconductor substrate, a magnetic member needs to be disposed adjacently to a path, serving as a core, on the substrate. The nonreciprocal waveguide on the semiconductor substrate is manufactured by primarily applying a semiconductor process. On the other hand, a magnetic material is a contamination source that affects semiconductor properties. Therefore, consideration is being made of forming by etching a trench at a position where the magnetic member is to be disposed to thereby end the semiconductor process and embed the magnetic material in the formed trench.

In forming the nonreciprocal waveguide on the semiconductor substrate, the precision of a position where the magnetic material is to be embedded needs to be high with respect to the path. However, in forming a deep trench in the semiconductor process, a side wall of the trench may become tapered (refer to Japanese Unexamined Patent Application Publication No. 61-159737).

SUMMARY OF THE INVENTION

A nonreciprocal waveguide according to a first aspect of the disclosure includes:
a substrate;
a light propagation path that is positioned at the substrate along a substrate surface;
a magnetic member that is positioned at the substrate along part of the light propagation path in a longitudinal direction;
an insulating layer that is positioned at the substrate and that contains the light propagation path and the magnetic member; and
a mask that, inside the insulating layer, is positioned further away than the light propagation path from the substrate,
in which, as seen from a direction perpendicular to the substrate surface, the mask overlaps at least part of the light propagation path in a width direction from a side of the light propagation path opposite to the magnetic member in the width direction and is positioned in at least a range in which the magnetic member is positioned in the longitudinal direction.

An isolator according to a second aspect includes the nonreciprocal waveguide including a substrate, a light propagation path that is positioned at the substrate along a substrate surface, a magnetic member that is positioned at the substrate along part of the light propagation path in a longitudinal direction, an insulating layer that is positioned at the substrate and that contains the light propagation path and the magnetic member, and a mask that, inside the insulating layer, is positioned further away than the light propagation path from the substrate. In the nonreciprocal waveguide, as seen from a direction perpendicular to the substrate surface, the mask overlaps at least part of the light propagation path in a width direction from a side of the light propagation path opposite to the magnetic member in the width direction and is positioned in at least a range in which the magnetic member is positioned in the longitudinal direction.

An optical switch according to a third aspect includes the nonreciprocal waveguide including a substrate, a light propagation path that is positioned at the substrate along a substrate surface, a magnetic member that is positioned at the substrate along part of the light propagation path in a longitudinal direction, an insulating layer that is positioned at the substrate and that contains the light propagation path and the magnetic member, and a mask that, inside the insulating layer, is positioned further away than the light propagation path from the substrate. In the nonreciprocal waveguide, as seen from a direction perpendicular to the substrate surface, the mask overlaps at least part of the light propagation path in a width direction from a side of the light propagation path opposite to the magnetic member in the width direction and is positioned in at least a range in which the magnetic member is positioned in the longitudinal direction.

An optical transceiver according to a fourth aspect includes the nonreciprocal waveguide including a substrate, a light propagation path that is positioned at the substrate along a substrate surface, a magnetic member that is positioned at the substrate along part of the light propagation path in a longitudinal direction, an insulating layer that is positioned at the substrate and that contains the light propagation path and the magnetic member, and a mask that, inside the insulating layer, is positioned further away than the light propagation path from the substrate. In the nonreciprocal waveguide, as seen from a direction perpendicular to the substrate surface, the mask overlaps at least part of the light propagation path in a width direction from a side of the light propagation path opposite to the magnetic member in the width direction and is positioned in at least a range in which the magnetic member is positioned in the longitudinal direction.

A data center according to a fifth aspect includes the nonreciprocal waveguide including a substrate, a light propagation path that is positioned at the substrate along a substrate surface, a magnetic member that is positioned at the substrate along part of the light propagation path in a longitudinal direction, an insulating layer that is positioned at the substrate and that contains the light propagation path and the magnetic member, and a mask that, inside the insulating layer, is positioned further away than the light propagation path from the substrate. In the nonreciprocal waveguide, as seen from a direction perpendicular to the substrate surface, the mask overlaps at least part of the light propagation path in a width direction from a side of the light propagation path opposite to the magnetic member in the width direction and is positioned in at least a range in which the magnetic member is positioned in the longitudinal direction.

A nonreciprocal waveguide manufacturing method according to a sixth aspect includes:

forming a light propagation path at a substrate, the light propagation path having a longitudinal direction along a substrate surface;

depositing a first insulator and embedding the light propagation path;

forming a first mask layer on a side of the first insulator opposite to the substrate, as seen from a direction perpendicular to the substrate surface, the first mask layer not overlapping a first trench formation region and overlapping at least part of the light propagation path in a width direction from a side opposite to one end of the light propagation path in the width direction, the first trench formation region being positioned along the light propagation path adjacently to the one end of the light propagation path at part of the light propagation path in the longitudinal direction;

depositing a second insulator and embedding the first mask layer;

forming a second mask layer on a side of the second insulator opposite to the substrate, as seen from the direction perpendicular to the substrate surface, the second mask layer covering a region other than a second trench formation region, part or an entirety of the second trench formation region overlapping at least part of the first trench formation region;

forming a trench by etching the first insulator and the second insulator from a side of the second mask layer; and forming a magnetic member in the trench.

DESCRIPTION OF THE PREFERRED EMBODIMENTS

An embodiment of a nonreciprocal waveguide to which the disclosure is applied is described below with reference to the drawings.

Figure 1:
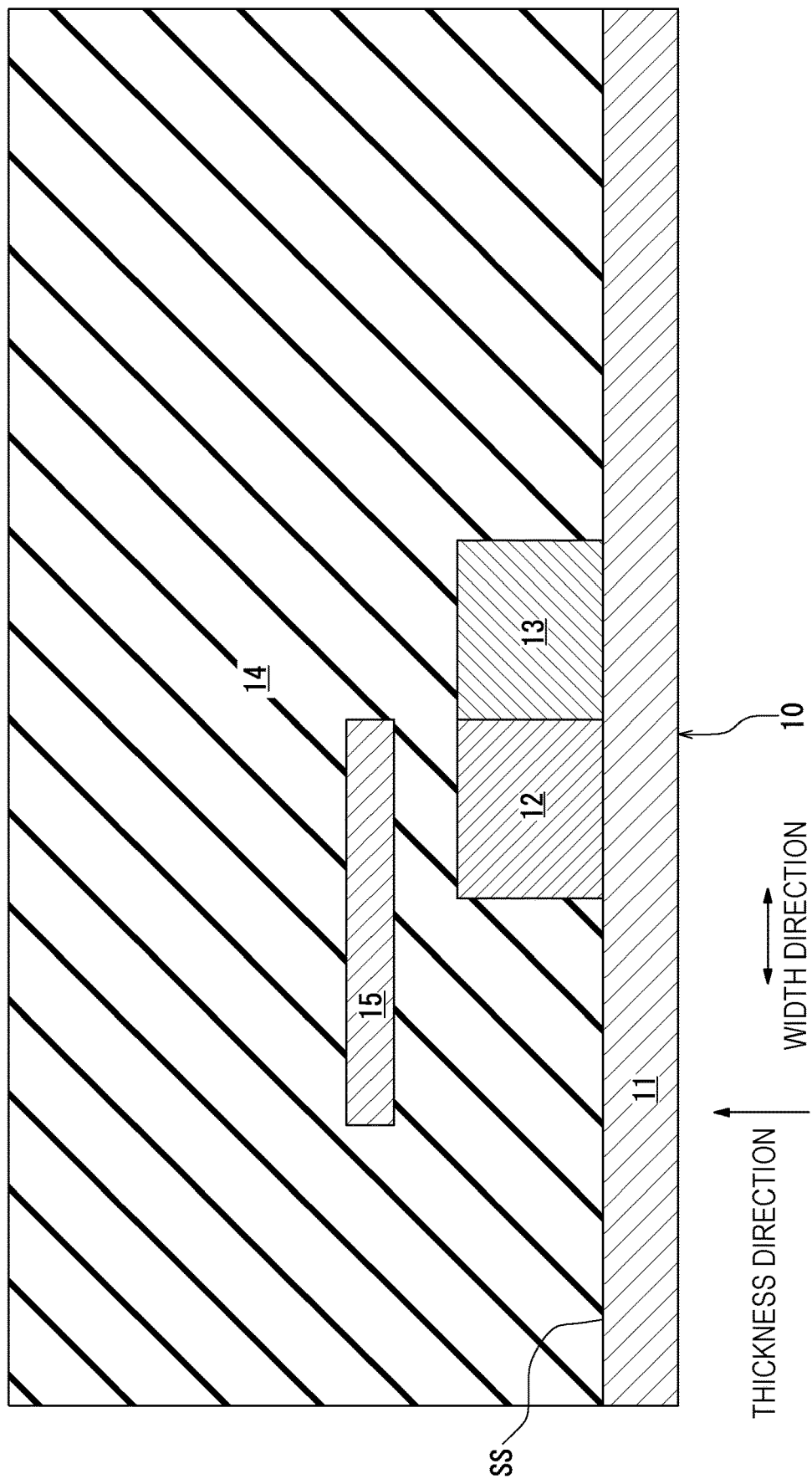
FIG. 1 is a sectional view of a nonreciprocal waveguide according to an embodiment that has been cut by a plane perpendicular to a longitudinal direction of a light propagation path.

FIG. 1 is a sectional view of a nonreciprocal waveguide 10 according to an embodiment in a plane perpendicular to a light propagation direction. The nonreciprocal waveguide 10 may be applied to, for example, an isolator, an optical switch, an optical transceiver, or a data center.

The nonreciprocal waveguide 10 includes a substrate 11, a light propagation path 12, a magnetic member 13, an insulating layer 14, and a mask 15.

The substrate 11 is a flat substrate. The substrate 11 has a substrate surface ss serving as a main surface. The main surface may be the largest surface. The substrate 11 may be made of a material having a refractive index that is lower than the refractive index of the material of the light propagation path 12. The substrate 11 is made of, for example, $SiO_2$, $SiO_x$, or SiON.

The light propagation path 12 is positioned on the substrate 11. The light propagation path 12 is positioned along the substrate surface ss, which is one of the main surfaces of the substrate 11. The main surface may be the widest surface among a plurality of plane surfaces that defines the substrate 11. The light propagation path 12 may have a longitudinal direction. Light may propagate through the light propagation path 12 in a longitudinal direction.

In the specification, a direction perpendicular to the longitudinal direction and that is parallel to the substrate surface ss is called a width direction. In the specification, a direction perpendicular to the substrate surface ss is also called a thickness direction. The width of the light propagation path 12 is desirably included in a range in which a high-order mode does not occur when light propagates, and is 400 nm to 500 nm when, for example, the light propagation path 12 is made of Si. The width of the light propagation path 12 is a length in the width direction. The height of the light propagation path 12 is, for example, 200 nm to 300 nm. The height of the light propagation path 12 is a length in the thickness direction.

As described above, the light propagation path 12 may be made of a material having a refractive index that is higher than the refractive index of the material of the substrate 11. The light propagation path 12 is made of, for example, Si, SiN, or $SiO_x$.

Figure 2:
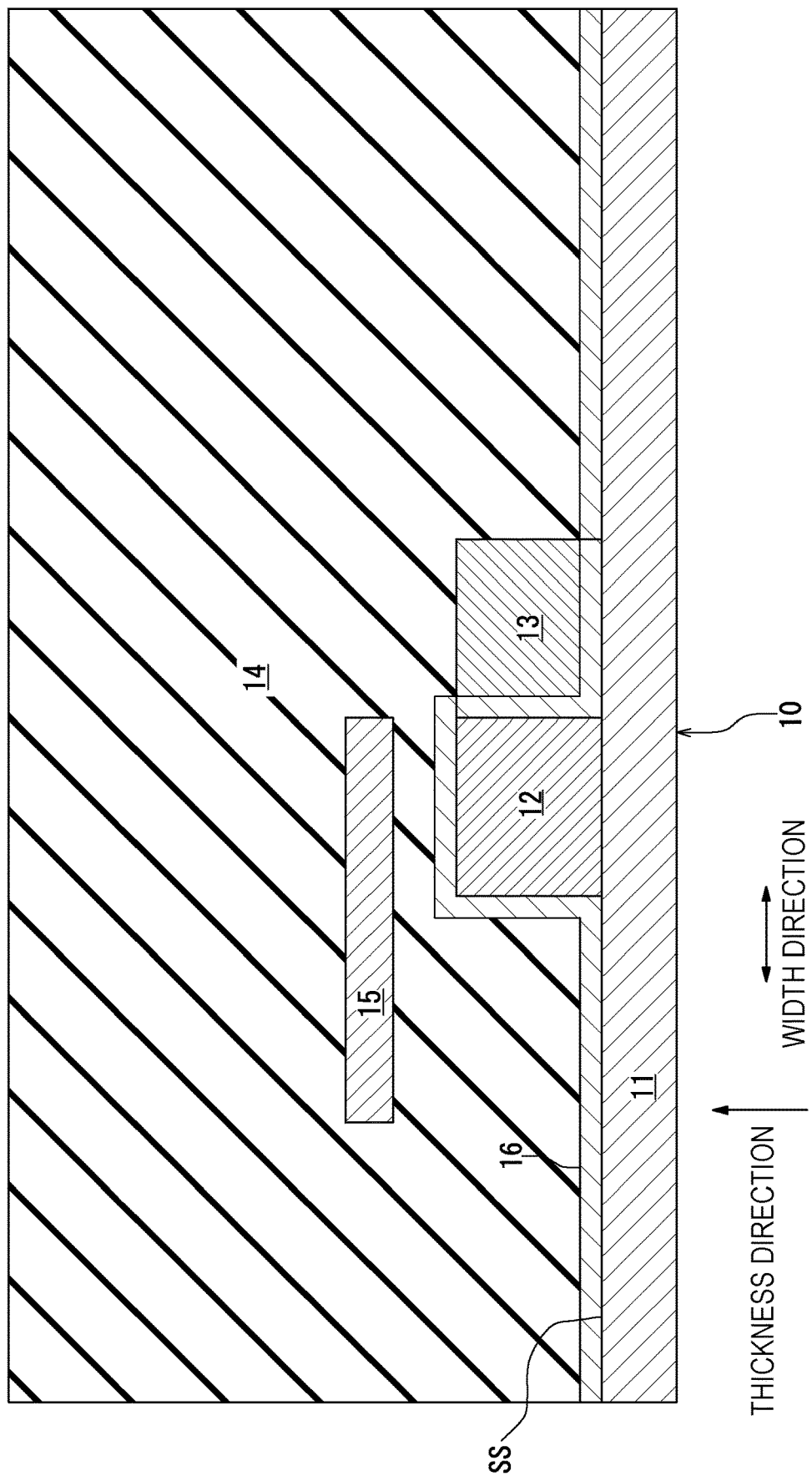
FIG. 2 is a sectional view of a modification of the nonreciprocal waveguide in FIG. 1.

As shown in FIG. 2, the light propagation path 12, together with the substrate ss, may be covered with a stop layer 16. The stop layer 16 may prevent the substrate 11 and the light propagation path 12 from being etched in an etching step during a manufacturing process of the nonreciprocal waveguide 10. The stop layer 16 may have a thickness of, for example, 50 nm to 100 nm.

The stop layer 16 may be made of a material described below having a selection ratio that is lower than the selection ratio of the material of the insulating layer 14, each selection ratio being a ratio with respect to a first mask layer or a second mask layer during manufacturing. Further, the stop layer 16 may be made of a material having a refractive index that is lower than the refractive index of the material of the light propagation path 12. The stop layer 16 is made of, for example, SiN.

Figure 3:
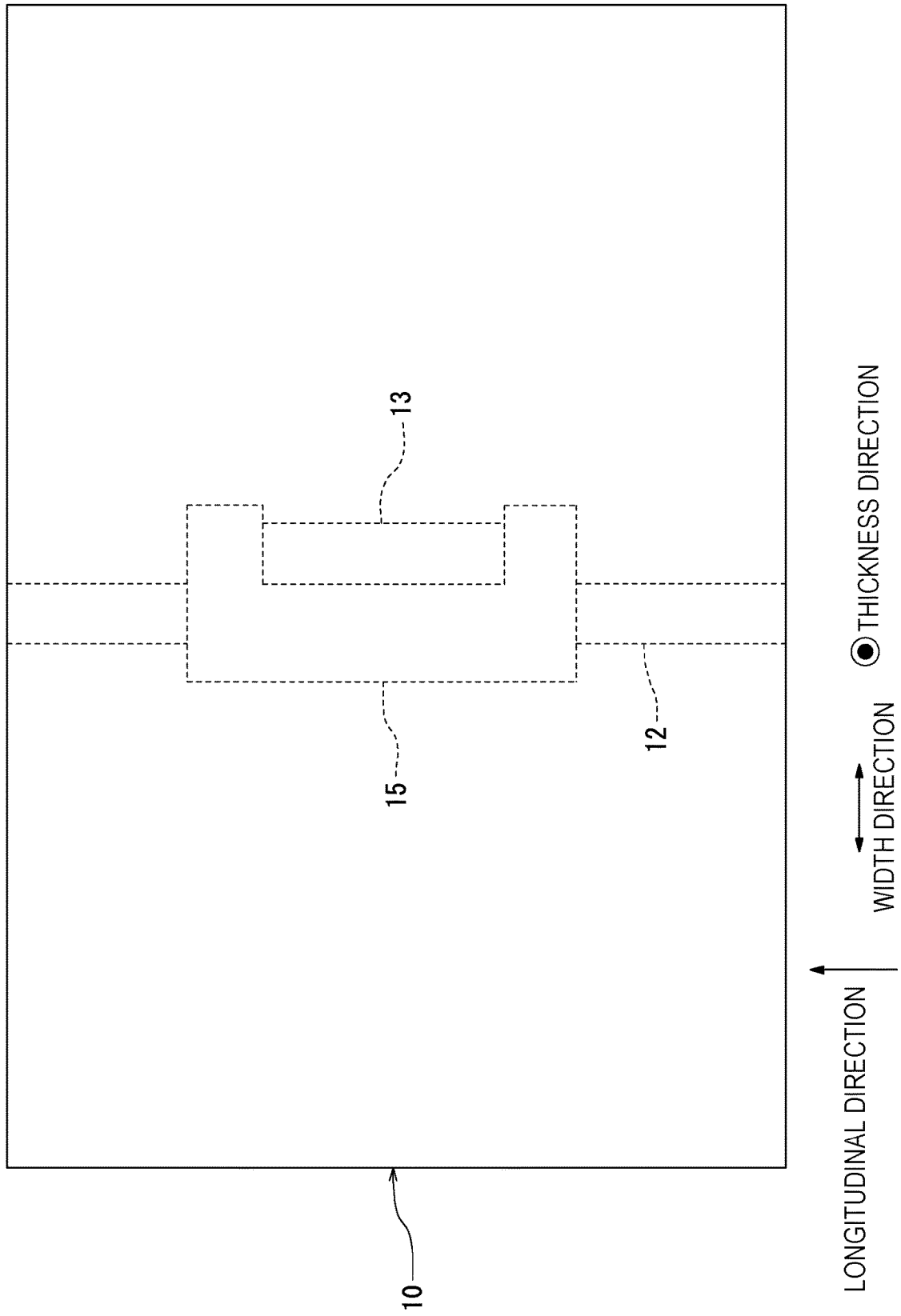
FIG. 3 is a top view of the positions of the light propagation path, a magnetic member, and a mask in FIG. 1 when the nonreciprocal waveguide is seen from a thickness direction.

As shown in FIG. 1, the magnetic member 13 is positioned on the substrate 11. As shown in FIG. 2, the magnetic member 13 may be positioned on the substrate 11 with the stop layer 16 interposed therebetween. As shown in FIG. 3, the magnetic member 13 is positioned along part of the light propagation path 12 in the longitudinal direction.

Figure 4:
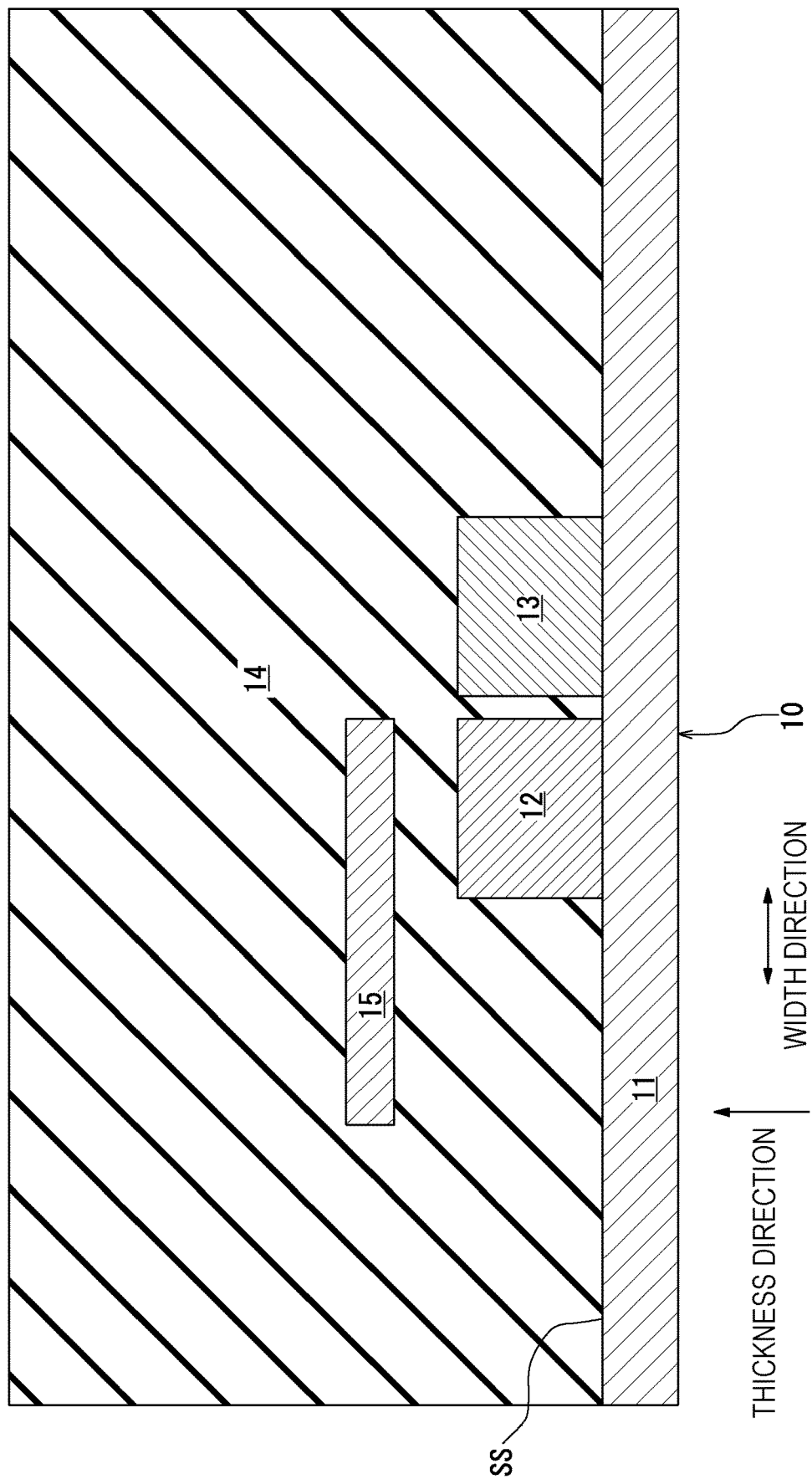
FIG. 4 is a sectional view of a different modification of the nonreciprocal waveguide in FIG. 1.

The magnetic member 13 may surface-contact the light propagation path 12 in the width direction. Alternatively, as shown in FIG. 4, in the width direction, the magnetic member 13 may be separated from the light propagation path 12 in a range in which the light propagation path 12 is provided with nonreciprocity. The magnetic member 13 may be spaced by an interval of, for example, 100 nm or smaller from a surface of the light propagation path 12 facing the width direction.

In the thickness direction, at least part of the magnetic member 13 may overlap at least part of the light propagation path 12. In the embodiment, in the thickness direction, the magnetic member 13 overlaps the entire light propagation path 12.

The magnetic member 13 may be made of a transparent magnetic material, such as yttrium iron garnet (YIG) or a partly substituted material (for example, Ce substituted YIG or Bi substituted YIG); a ferromagnetic material, such as FeCo, FeNi, or CoPt; or a material containing such a ferromagnetic material. Alternatively, the magnetic member 13 may be made of a dielectric that is a composite of magnetic nanoparticles, such as a nanogranular material.

Figure 5:
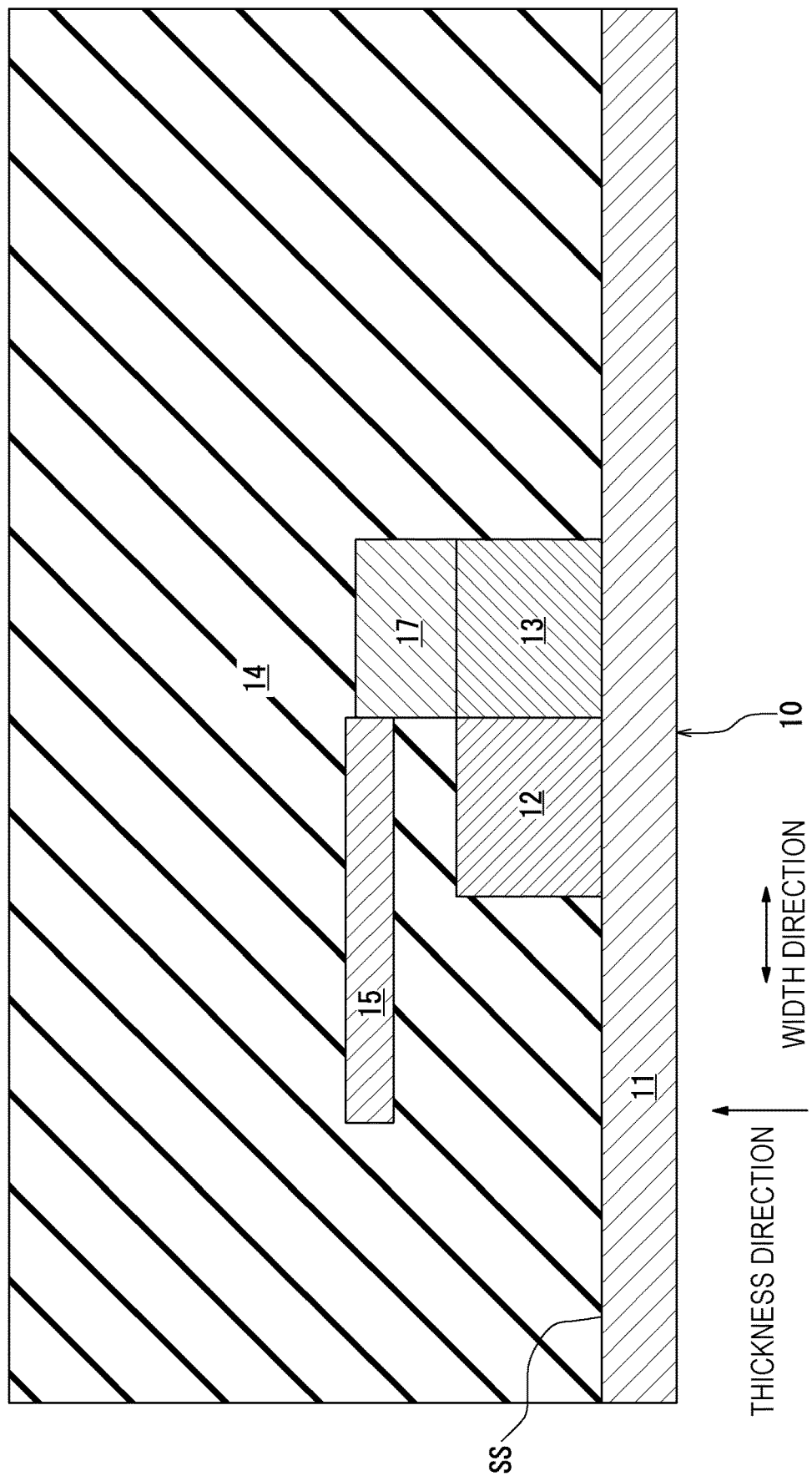
FIG. 5 is a sectional view of a different modification of the nonreciprocal waveguide in FIG. 1.

As shown in FIG. 5, a ferromagnetic member 17 may be disposed adjacently to the magnetic member 13. The ferromagnetic member 17 may apply a magnetic field to the magnetic member 13. The ferromagnetic member 17 may be made a ferromagnetic material or a material containing such a ferromagnetic material.

Figure 6:
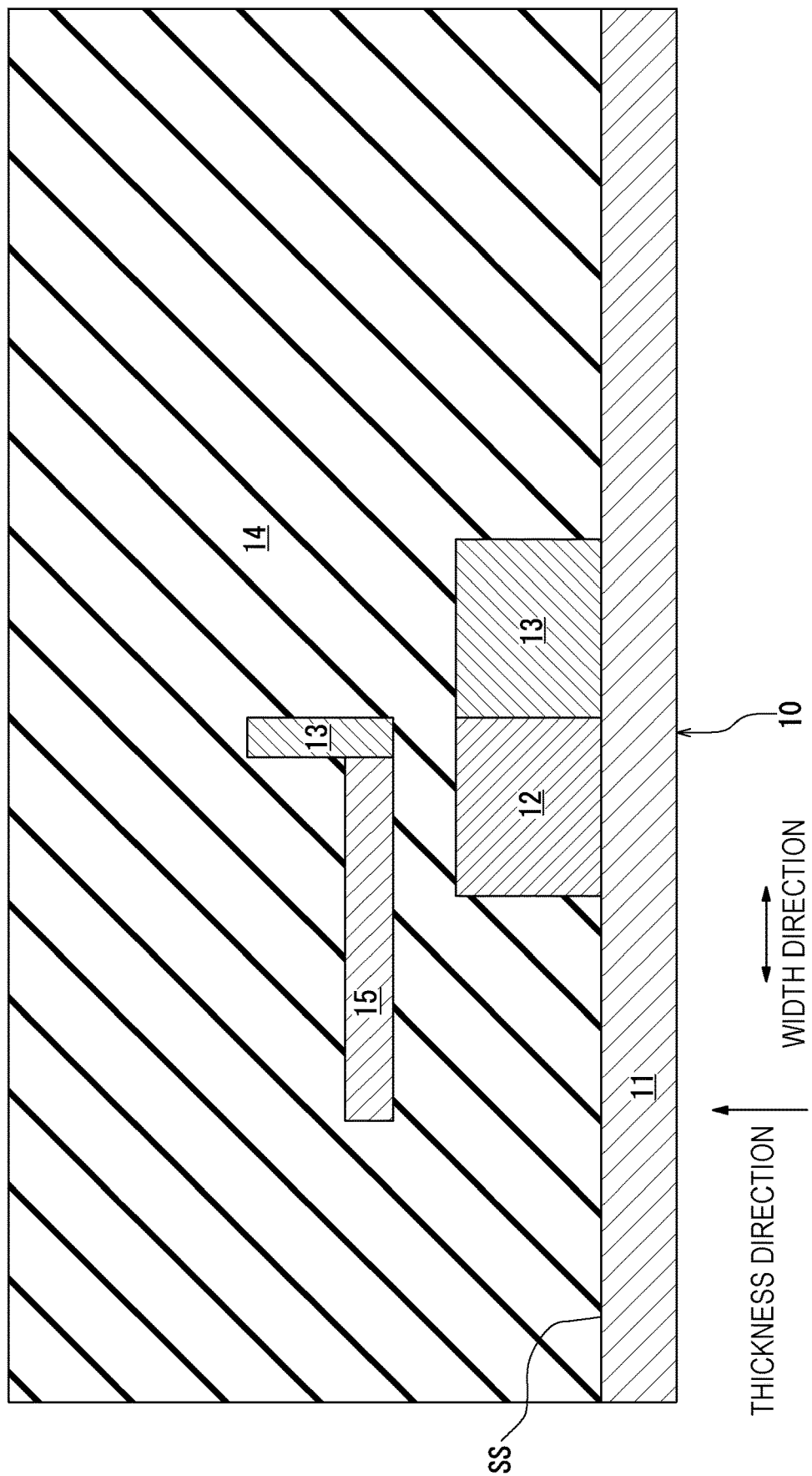
FIG. 6 is a sectional view of a different modification of the nonreciprocal waveguide in FIG. 1.
Figure 7:
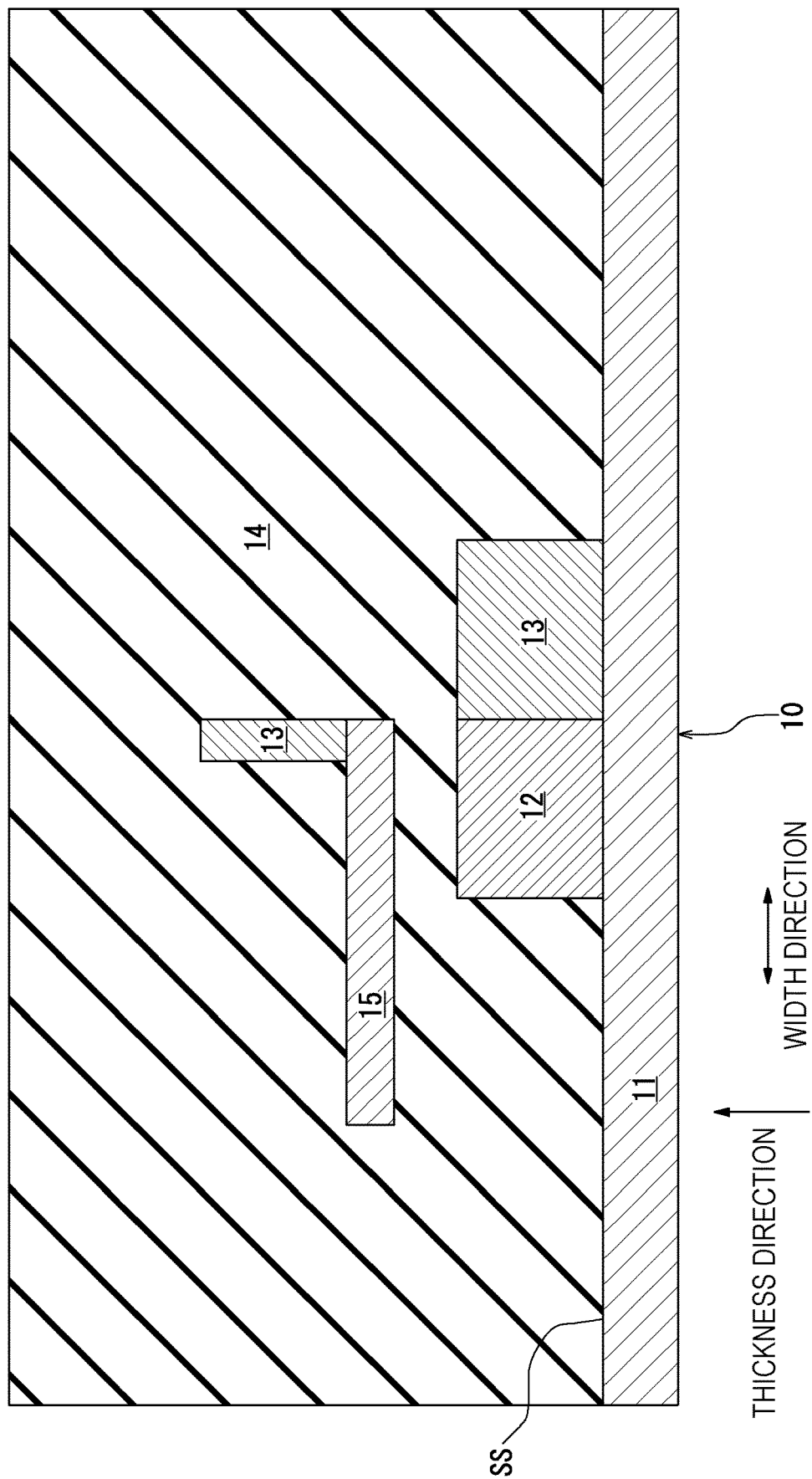
FIG. 7 is a sectional view of a different modification of the nonreciprocal waveguide in FIG. 1.

Although the magnetic member 13 is disposed beside the light propagation path 12 in the width direction, another magnetic member 13 may also be disposed beside the light propagation path 12 in the thickness direction. As shown in FIG. 6, the magnetic member 13 that is disposed beside the light propagation path 12 in the thickness direction may be adjacent to the light propagation path 12 with the insulating layer 14 being interposed therebetween. Alternatively, as shown in FIG. 7, the magnetic member 13 that is disposed beside the light propagation path 12 in the thickness direction may be adjacent to the light propagation path 12 with the mask 15 and the insulating layer 14 being interposed therebetween.

As shown in FIG. 1, the insulating layer 14 is positioned on the substrate 11. The insulating layer 14 contains the light propagation path 12 and the magnetic member 13. As shown in FIG. 4, in the structure in which the light propagation path 12 and the magnetic member 13 are adjacent to each other in the width direction, the insulating layer 14 may be interposed between the light propagation path 12 and the magnetic member 13. The thickness of the insulating layer 14 may be 2 μm to 20 μm.

The insulating layer 14 may be made of a material having a refractive index that is lower than the refractive index of the material of the light propagation path 12. The insulating layer 14 is made of, for example, $SiO_2$, $SiO_x$, or SiON.

As shown in FIG. 1, inside the insulating layer 14, the mask 15 is positioned further away than the light propagation path 12 from the substrate 11. As seen from the direction perpendicular to the substrate surface ss, that is, the thickness direction, the mask 15 overlaps at least part of the light propagation path 12 in the width direction. The mask 15 overlaps the light propagation path 12 from a side opposite to the magnetic member 13 in the width direction.

Figure 8:
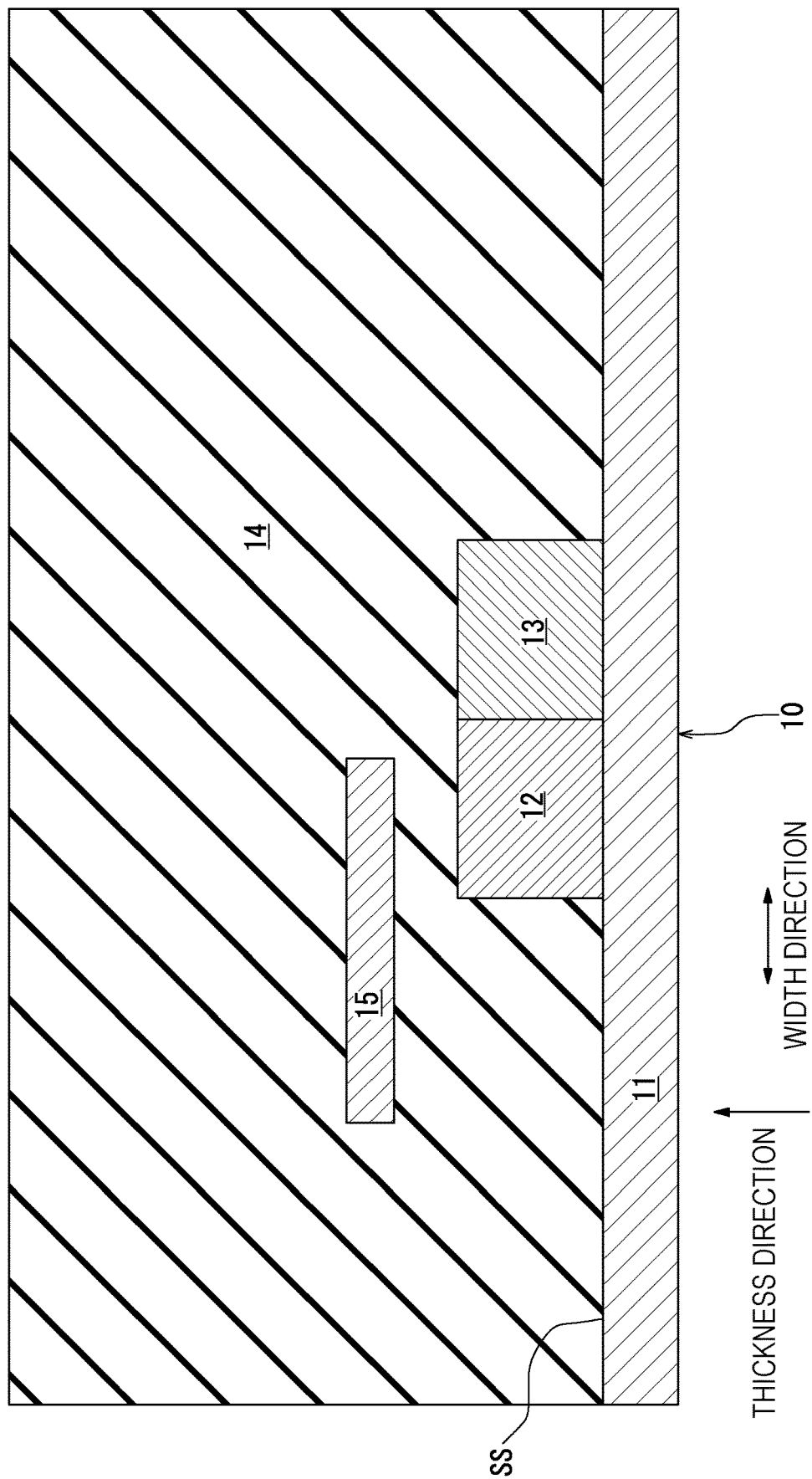
FIG. 8 is a sectional view of a different modification of the nonreciprocal waveguide in FIG. 1.
Figure 9:
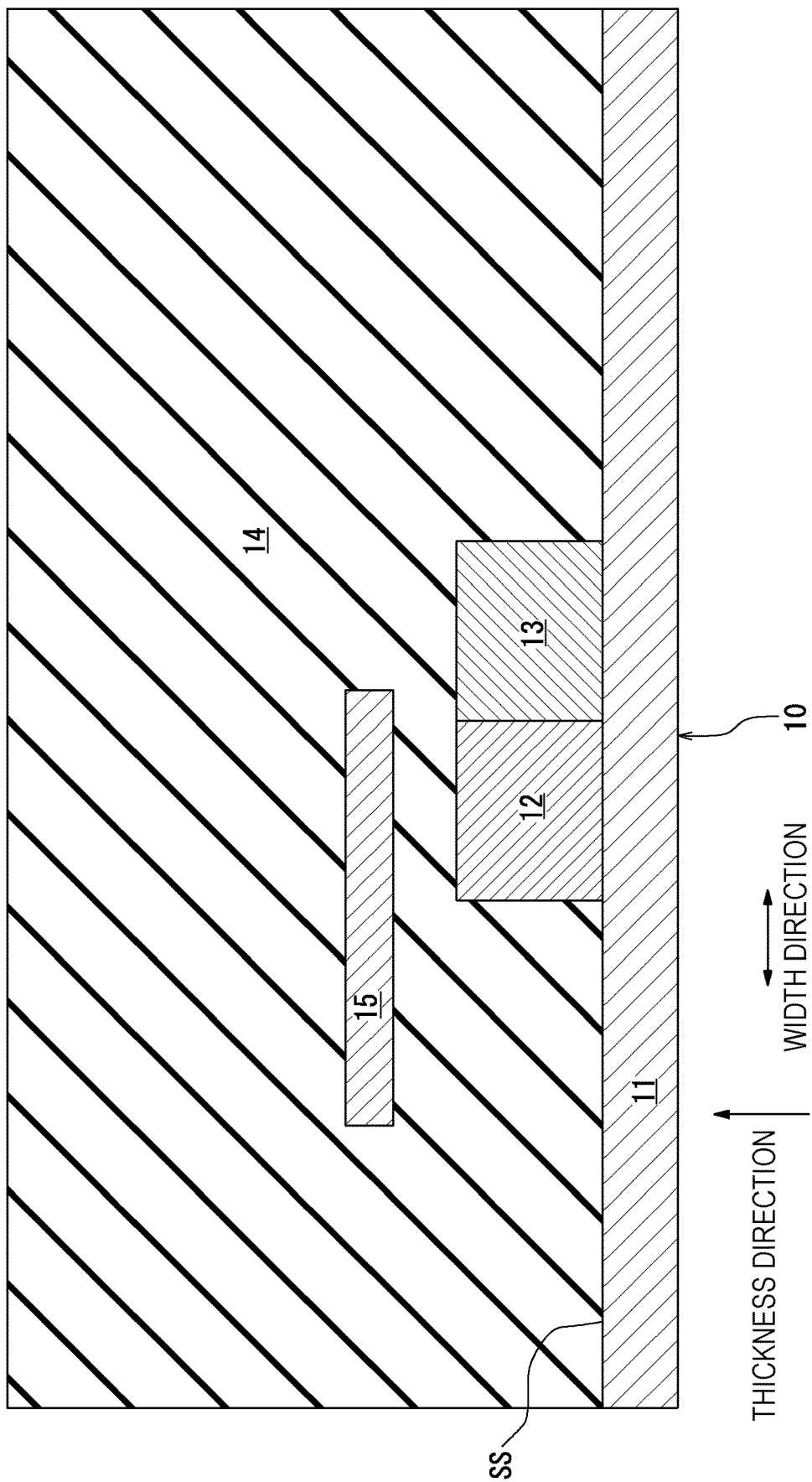
FIG. 9 is a sectional view of a different modification of the nonreciprocal waveguide in FIG. 1.

As seen from the direction perpendicular to the substrate surface ss, that is, the thickness direction, the mask 15 need not overlap the magnetic member 13. In the width direction, a terminal end of the mask 15 may be disposed at a position that corresponds with the position of an end, adjacent to the magnetic member 13, of the light propagation path 12. Alternatively, as shown in FIG. 8, as seen from the direction perpendicular to the substrate surface ss, that is, the thickness direction, the mask 15 need not cover an end portion, adjacent to the magnetic member 13, of the light propagation path 12. Alternatively, as shown in FIG. 9, as seen from the direction perpendicular to the substrate surface ss, that is, the thickness direction, an end, adjacent to the magnetic member 13, of the mask 15 in the width direction may be disposed beyond the end, adjacent to the magnetic member 13, of the light propagation path 12. As seen from the direction perpendicular to the substrate surface ss, that is, the thickness direction, an end surface, adjacent to the magnetic member 13, of the mask 15 may have a shape corresponding to the shape of an end surface, adjacent to the light propagation path 12, of the magnetic member 13.

As shown in FIG. 3, as seen from the direction perpendicular to the substrate surface ss, that is, the thickness direction, the mask 15 is positioned in at least a range in which the magnetic member 13 is positioned in the longitudinal direction.

As shown in FIG. 1, the mask 15 may be positioned closer to the substrate 11 than a central position of a thickness of the insulating layer 14 in the direction perpendicular to the substrate surface ss, that is, the thickness direction. The mask 15 may be spaced from the substrate surface ss by a distance in a range of 1 μm to 2 μm.

The mask 15 may be made of a metal or a dielectric material having a sufficient selection ratio with respect to reactive etching for forming the insulating layer 14 in a manufacturing method described below. The metal that is applied to the insulating layer 14 is, for example, aluminum or copper.

Next, an embodiment of a method of manufacturing the nonreciprocal waveguide 10 to which the disclosure is applied is described. In the manufacturing method of the embodiment, an example in which Si is applied to the light propagation path 12 and in which $SiO_2$ is applied to the substrate 11 and the insulating layer 14 is described. However, as described above, the materials of the substrate 11, the light propagation path 12, and the insulating layer 14 are not limited to such materials.

Figure 10:
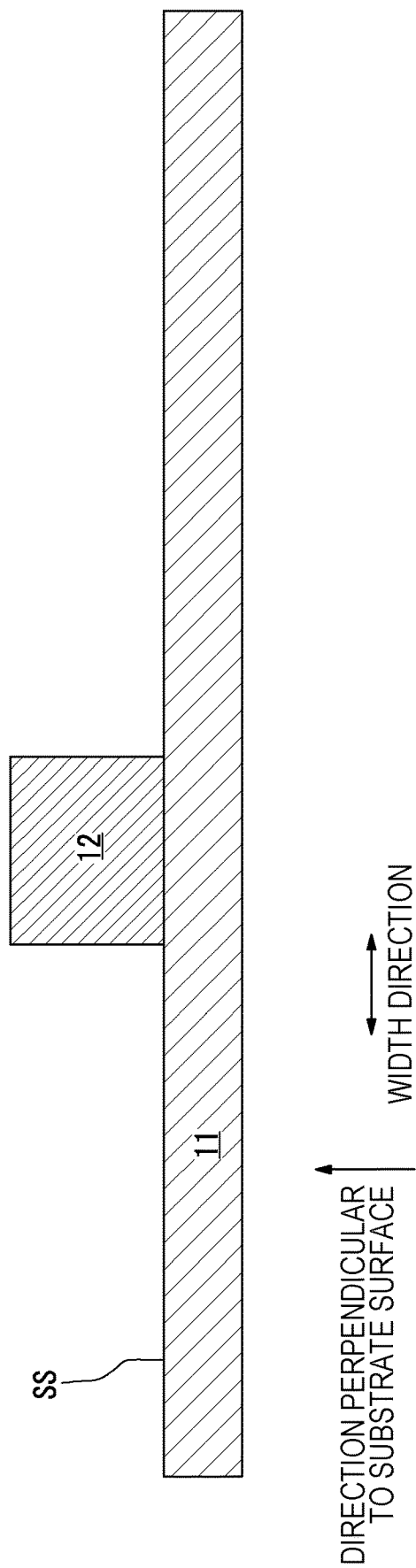
FIG. 10 is a sectional view, formed by a cutting plane perpendicular to a longitudinal direction, of a state in which the light propagation path has been formed on a substrate in a manufacturing process of the nonreciprocal waveguide in FIG. 1.

First, by performing patterning on one of Si layers of a silicon on insulator (SOI) substrate including a $SiO_2$ layer interposed between the Si layers at the surfaces, as shown in FIG. 10, the light propagation path 12 having a longitudinal direction along the substrate surface ss is formed on the substrate 11 including the $SiO_2$ layer.

Note that, as described above, a SiN layer having a thickness of 50 nm to 100 nm may be formed as the stop layer 16 on the substrate 11, on which the light propagation path 12 has been formed, by a publicly known deposition method, such as a chemical vapor deposition (CVD) method.

Figure 11:
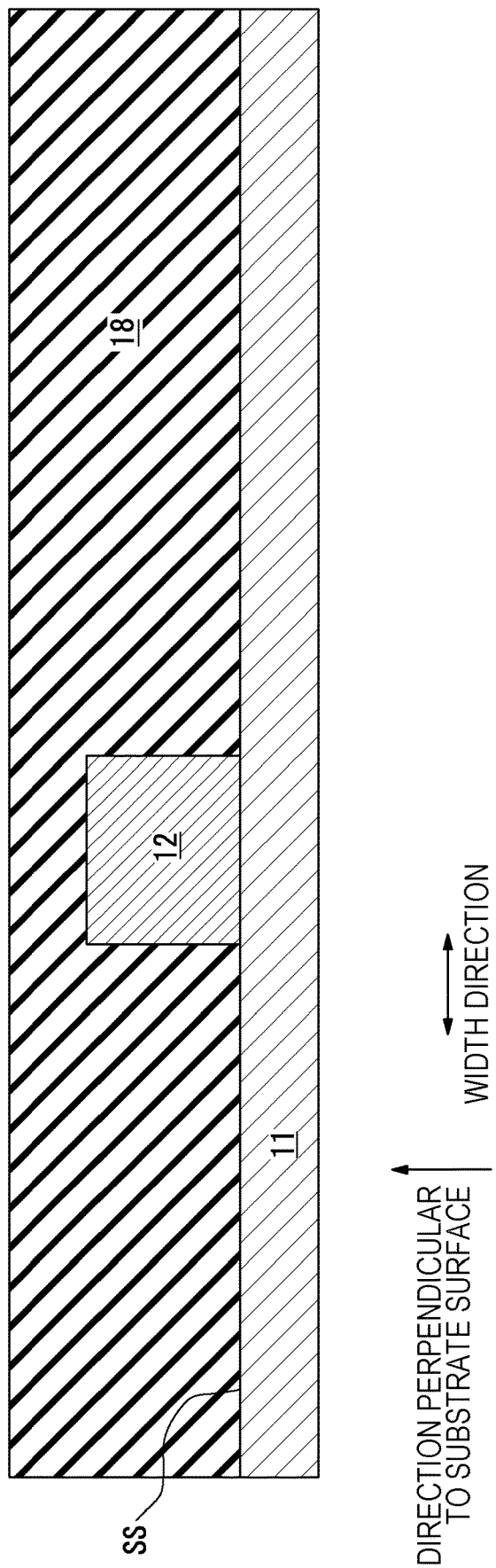
FIG. 11 is a sectional view, formed by a cutting plane perpendicular to the longitudinal direction, of a state in which a first insulator has been deposited in the manufacturing process of the nonreciprocal waveguide in FIG. 1.

Next, a first insulator 18 is deposited by, for example, CVD on the substrate 11 from a side of the substrate surface ss where the light propagation path 12 has been formed. The first insulator 18 is made of a material that is the same as the material of the insulating layer 14 of the nonreciprocal waveguide 10. After depositing the first insulator 18, as shown in FIG. 11, a surface of the first insulator 18 on a side opposite to the substrate surface ss may be planarized by performing a planarizing operation. Note that the first insulator 18 may be deposited or planarized so that the thickness of the first insulator 18, that is, the length of the first insulator 18 in the thickness direction is equal to the interval between the substrate 11 and the mask 15 of the nonreciprocal waveguide 10.

Figure 12:
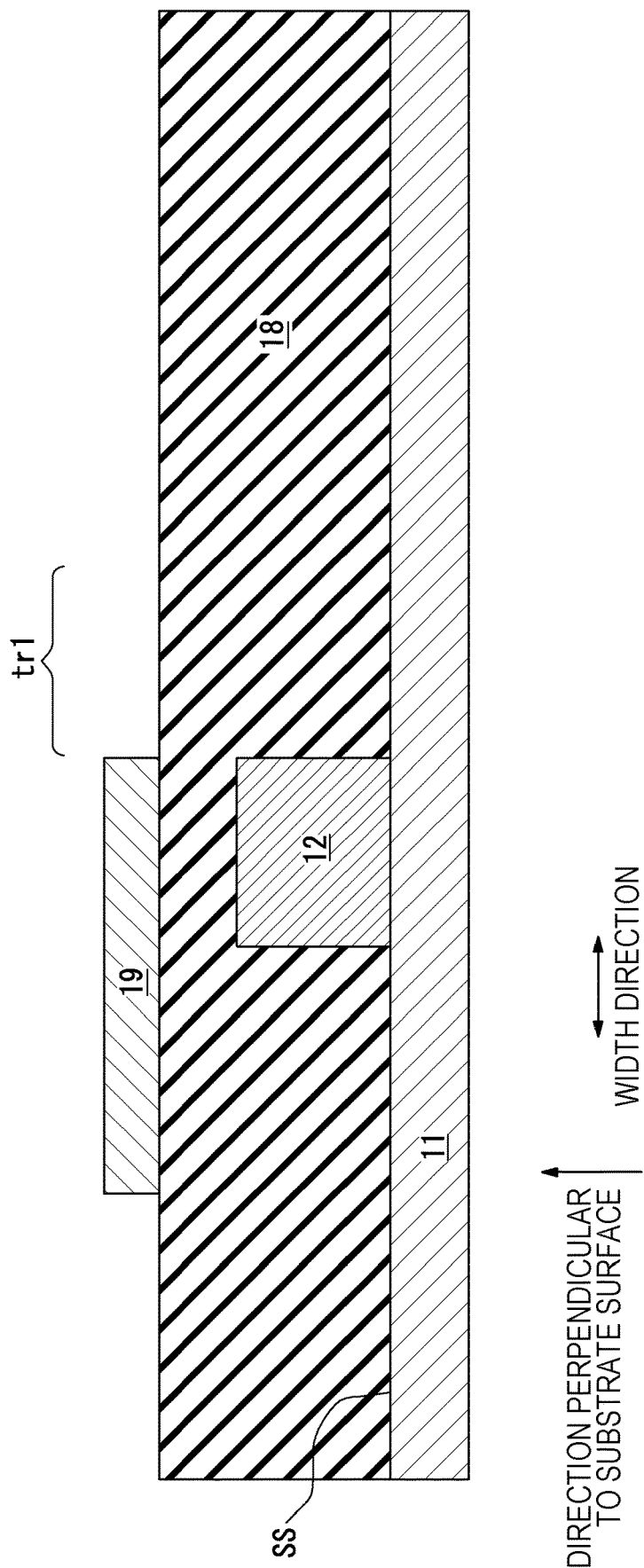
FIG. 12 is a sectional view, formed by a cutting plane perpendicular to the longitudinal direction, of a state in which a first mask layer has been formed in the manufacturing process of the nonreciprocal waveguide in FIG. 1.

As shown in FIG. 12, a first mask layer 19 is formed on a side of the first insulator 18 opposite to the substrate 11. The first mask layer 19 is formed by, for example, after depositing the material of the first mask layer 19 on the first insulator 18, forming the material of the first mask layer 19 into the form of a mask by lithography.

Figure 13:
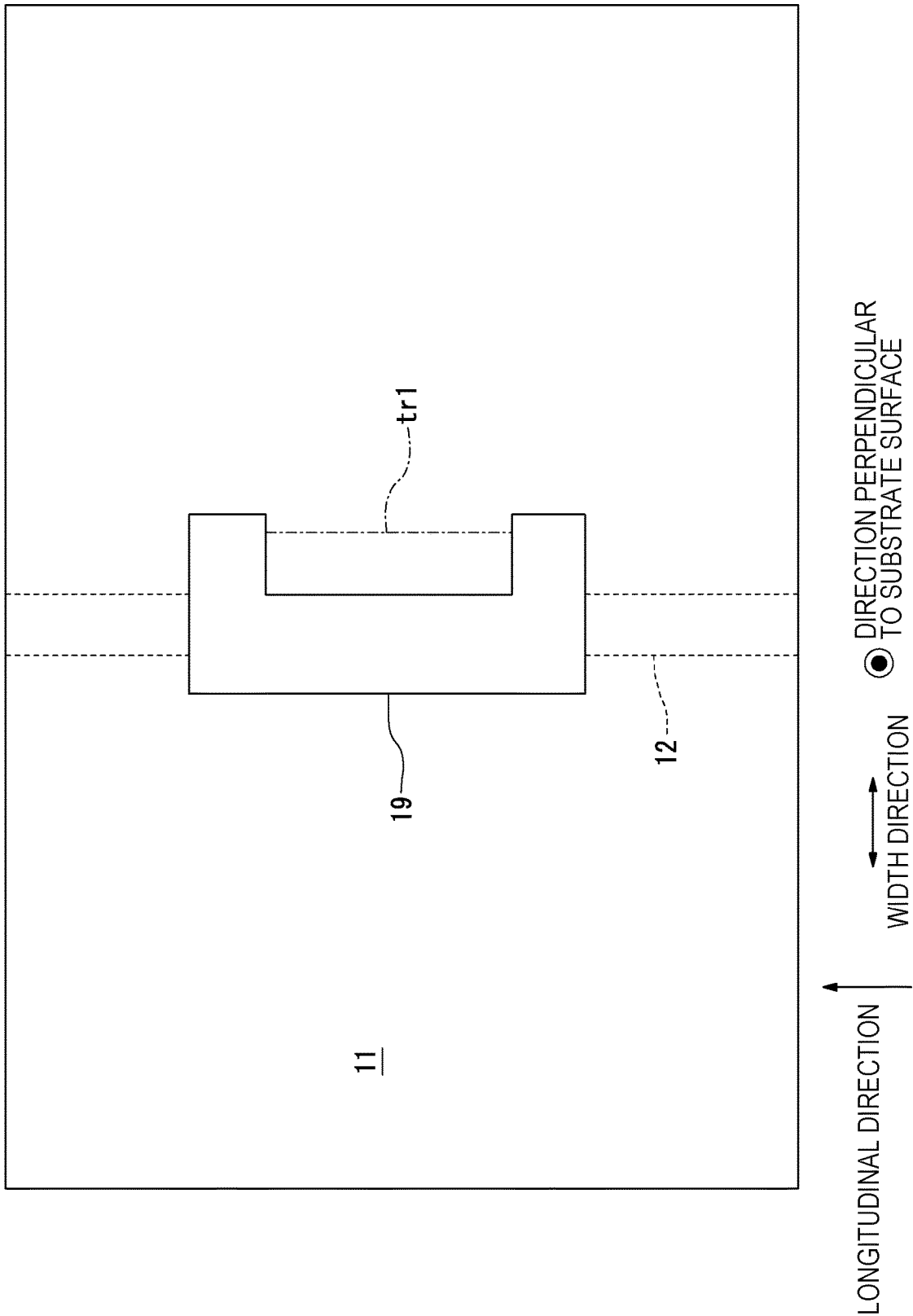
FIG. 13 is a top view of an intermediate product in FIG. 12 as seen from a direction perpendicular to a substrate surface.
Figure 14:
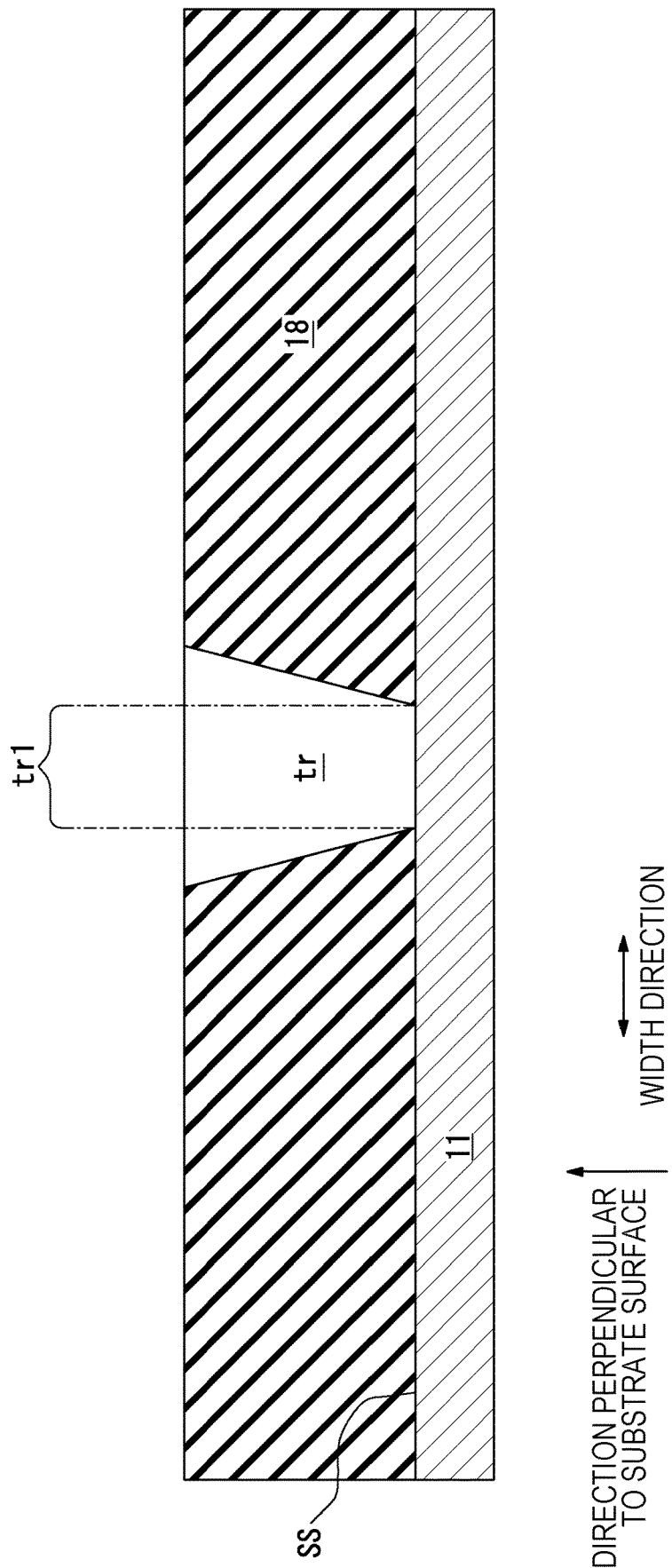
FIG. 14 is a sectional view of a first trench formation region when a tapering trench is to be formed by etching.

As shown in FIG. 13, as seen from the direction perpendicular to the substrate surface ss, the first mask layer 19 does not overlap a first trench formation region tr1. The first trench formation region tr1 may be a region where a trench for disposing the magnetic member 13 therein is to be formed in an entire region perpendicular to the substrate surface ss in a post-process. For example, as shown in FIG.

Figure 15:
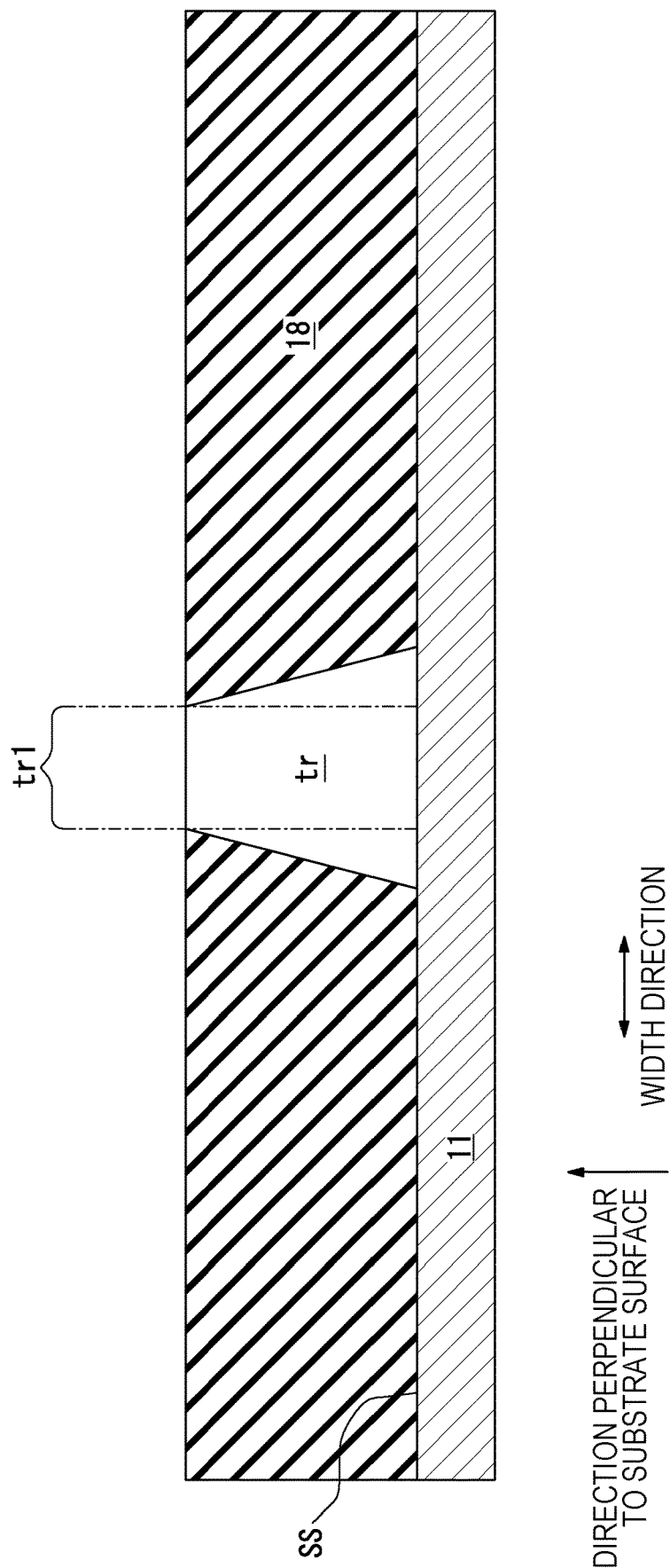
FIG. 15 is a sectional view of the first trench formation region when a reverse-tapering trench is to be formed by etching.

14, in etching for forming a trench tr whose width increases with increasing distance from the substrate surface ss, a region having the width of the trench tr adjacent to the substrate surface ss may be the first trench formation region tr1. Alternatively, as shown in FIG. 15, in etching for forming a trench tr whose width increases with decreasing distance to the substrate surface ss, a region having the width of the trench tr on a side opposite to the substrate surface ss may be the first trench formation region tr1.

The first trench formation region tr1 may be substantially the same as the region where the magnetic member 13 is to be formed. In other words, at part of the light propagation path 12 in the longitudinal direction, the first trench formation region tr1 is positioned along the light propagation path 12 at one end of the light propagation path 12 in the width direction.

Figure 16:
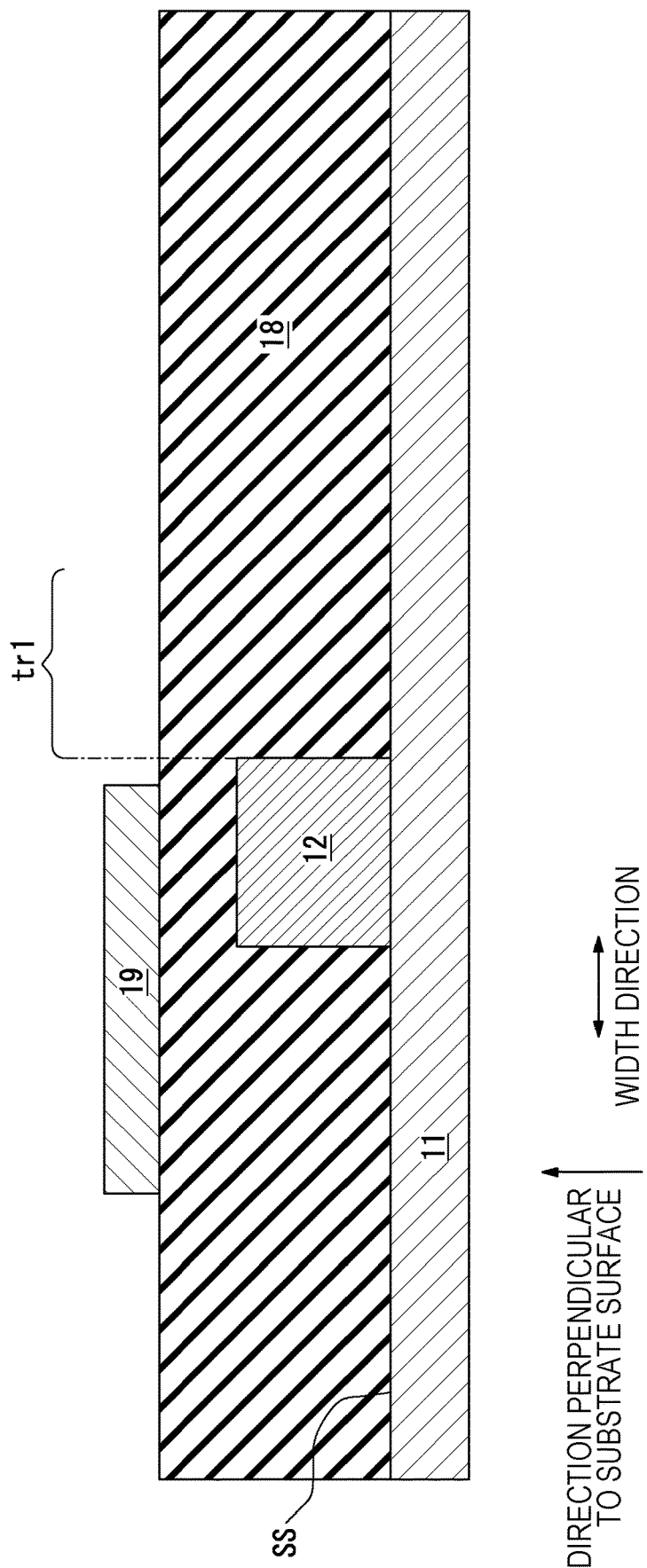
FIG. 16 is a sectional view, formed by a cutting plane perpendicular to the longitudinal direction, of a state in which a first mask layer has been deposited in a manufacturing process of the nonreciprocal waveguide in FIG. 8.
Figure 17:
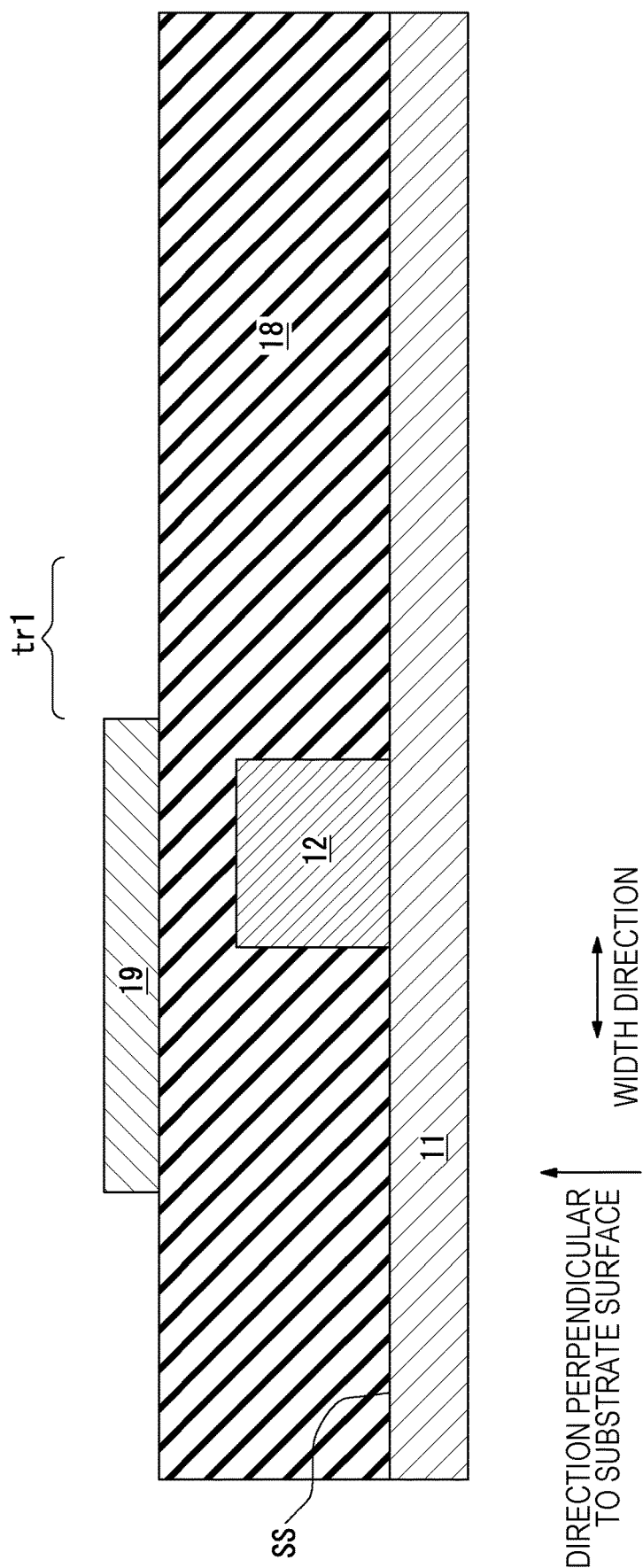
FIG. 17 is a sectional view, formed by a cutting plane perpendicular to the longitudinal direction, of a state in which a first mask layer has been deposited in a manufacturing process of the nonreciprocal waveguide in FIG. 9.

As shown in FIG. 12, as seen from the direction perpendicular to the substrate surface ss, the first mask layer 19 overlaps at least part of the light propagation path 12 in the width direction from a side of the light propagation path 12 opposite to a side where the first trench formation region tr1 is positioned. As shown in FIG. 16, the first mask layer 19 need not overlap an end portion of the light propagation path 12 on one end side adjacent to where the first trench formation region tr1 is positioned. Alternatively, as shown in FIG. 12, the first mask layer 19 may overlap the entire light propagation path 12 in the width direction. For example, as seen from the direction perpendicular to the substrate surface ss, the first mask layer 19 may have a terminal end at an end, adjacent to where the first trench formation region tr1 is positioned, of the light propagation path 12. Alternatively, as shown in FIG. 17, as seen from the direction perpendicular to the substrate surface ss, the first mask layer 19 may have a terminal end that is disposed beyond the end, adjacent to where the first trench formation region tr1 is positioned, of the light propagation path 12.

A formation material in which a selection ratio of the formation material of the first insulator 18 with respect to the formation material of the first mask layer 19 in etching for forming the trench tr described below is greater than or equal to the thickness of the first insulator 18 with respect to the thickness of the first mask layer 19 is applied to the first mask layer 19. The formation material of the first mask layer 19 is the same as the material of the mask 15.

Figure 18:
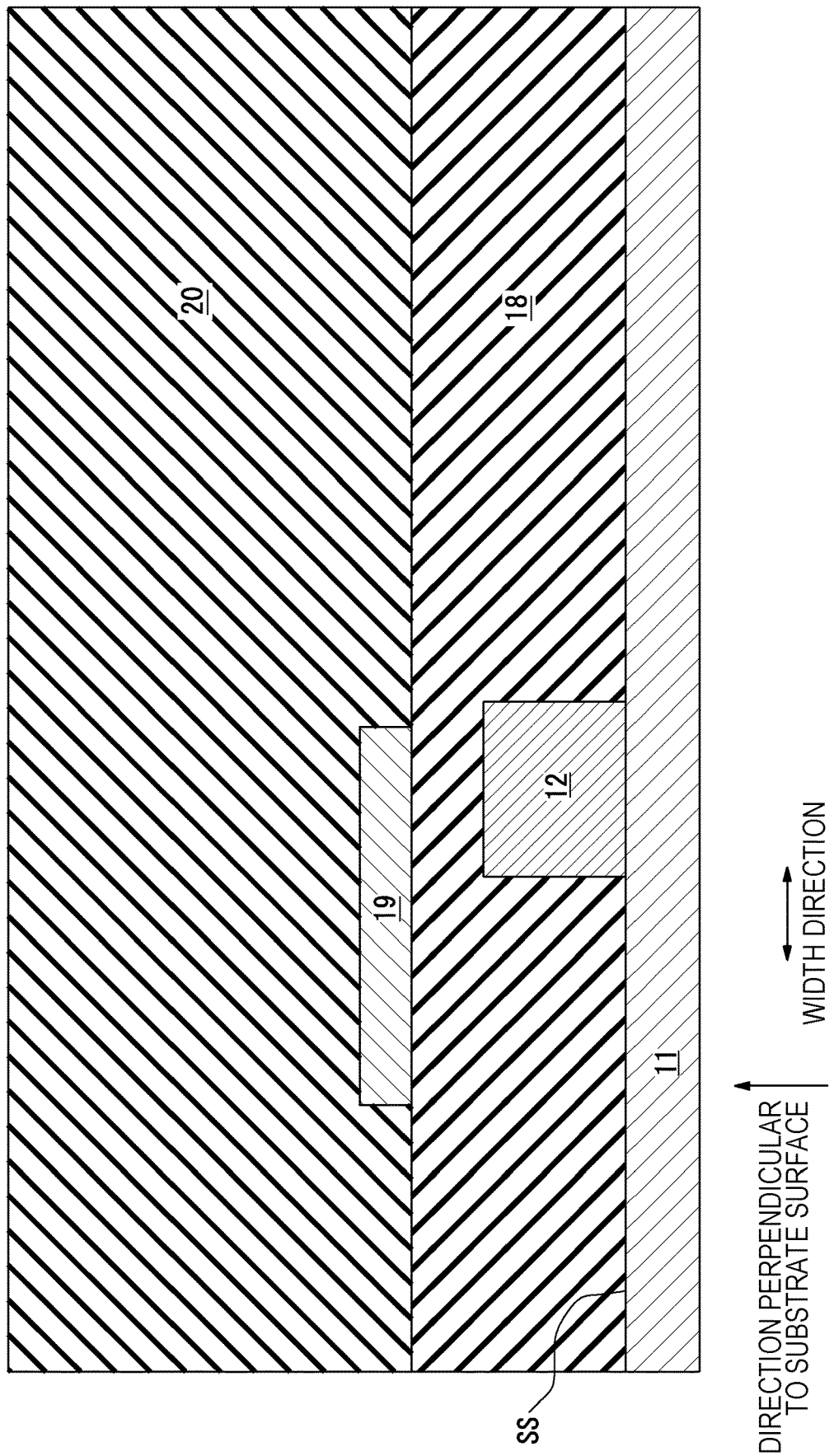
FIG. 18 is a sectional view, formed by a cutting plane perpendicular to the longitudinal direction, of a state in which a second insulator has been deposited in the manufacturing process of the nonreciprocal waveguide in FIG. 1.

Next, a second insulator 20 is deposited by, for example, chemical vapor deposition (CVD) on the first insulator 18 and the first mask layer 19 so as to embed the first mask layer 19. As shown in FIG. 18, after depositing the second insulator 20, a surface of the second insulator 20 on a side opposite to the substrate surface ss may be planarized by a planarizing operation. Note that the second insulator 20 may be deposited or planarized so that the total thickness of the first insulator 18 and the second insulator 20 becomes a thickness that is the same as the thickness of the insulating layer 14 of the nonreciprocal waveguide 10.

Figure 19:
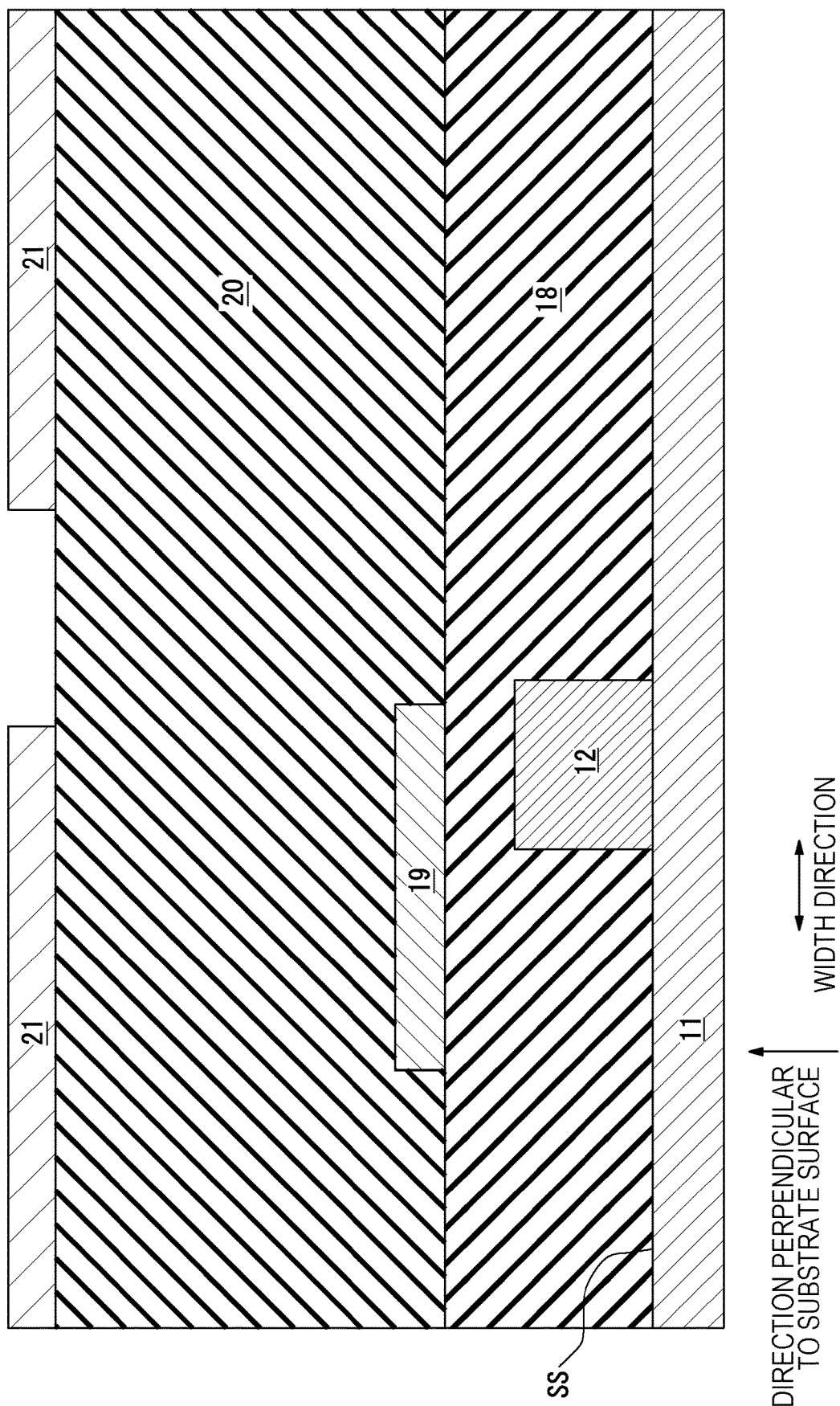
FIG. 19 is a sectional view, formed by a cutting plane perpendicular to the longitudinal direction, of a state in which a second mask layer has been formed in the manufacturing process of the nonreciprocal waveguide in FIG. 1.

As shown in FIG. 19, a second mask layer 21 is formed on a side of the second insulator 20 opposite to the substrate 11. The second mask layer 21 is formed by, for example, after depositing the material of the second mask layer 21 on the second insulator 20, forming the material of the second mask layer 21 into the form of a mask by lithography.

Figure 20:
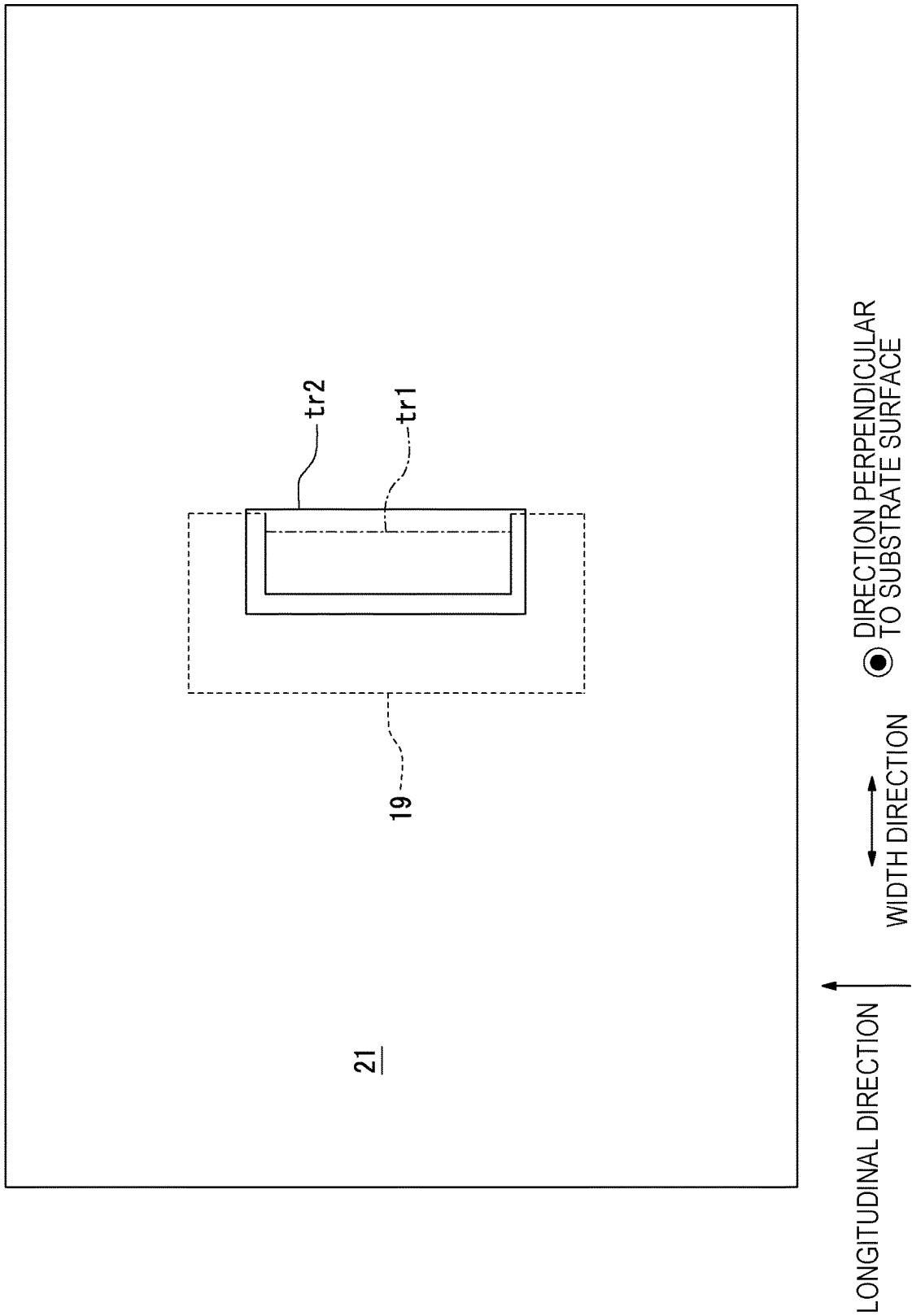
FIG. 20 is a top view of an intermediate product in FIG. 19 as seen from the direction perpendicular to the substrate surface.
Figure 21:
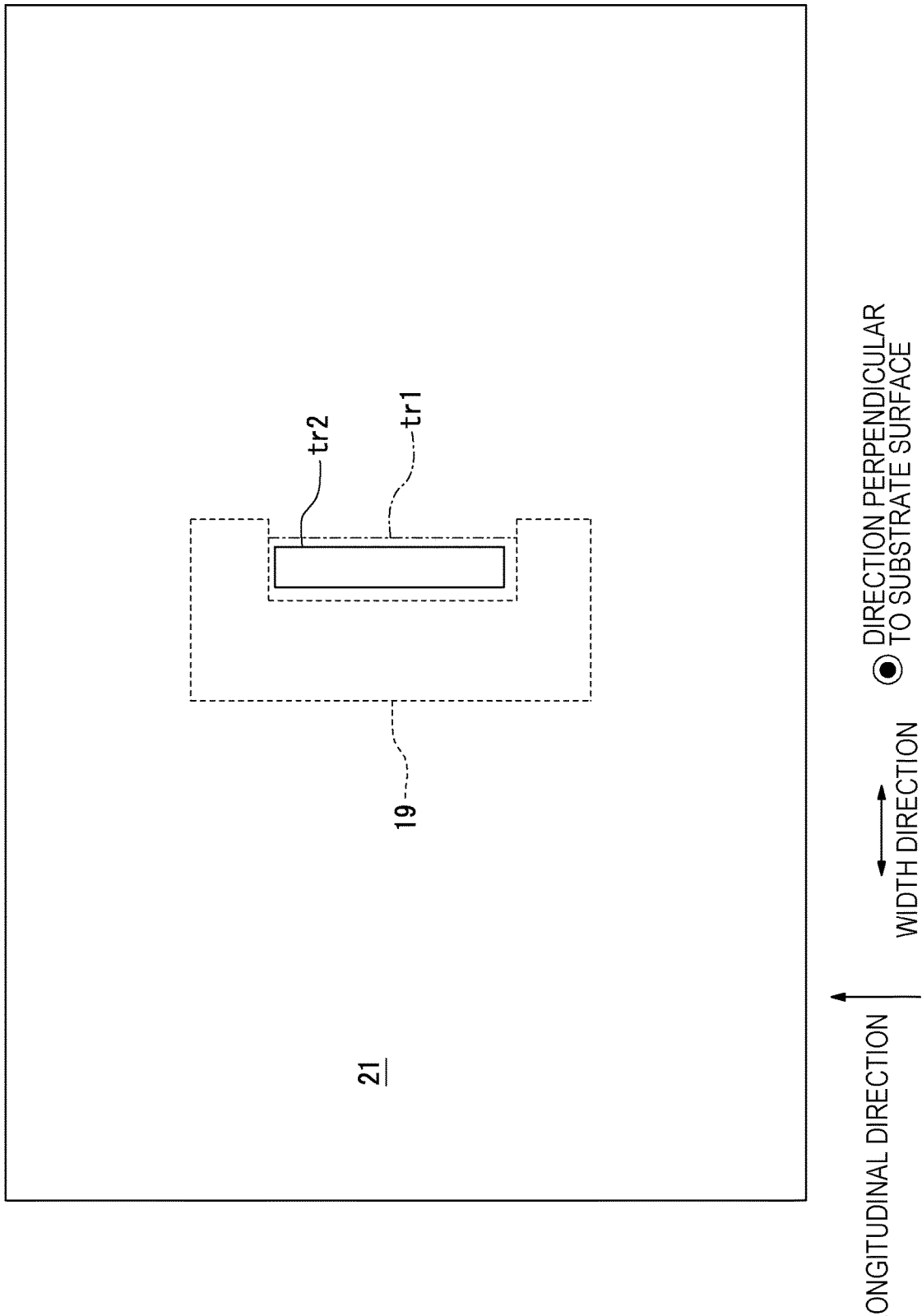
FIG. 21 is a top view, as seen from the direction perpendicular to the substrate surface, of an intermediate product where a second mask layer has been formed in the manufacturing process of the nonreciprocal waveguide in FIG. 9.
Figure 22:
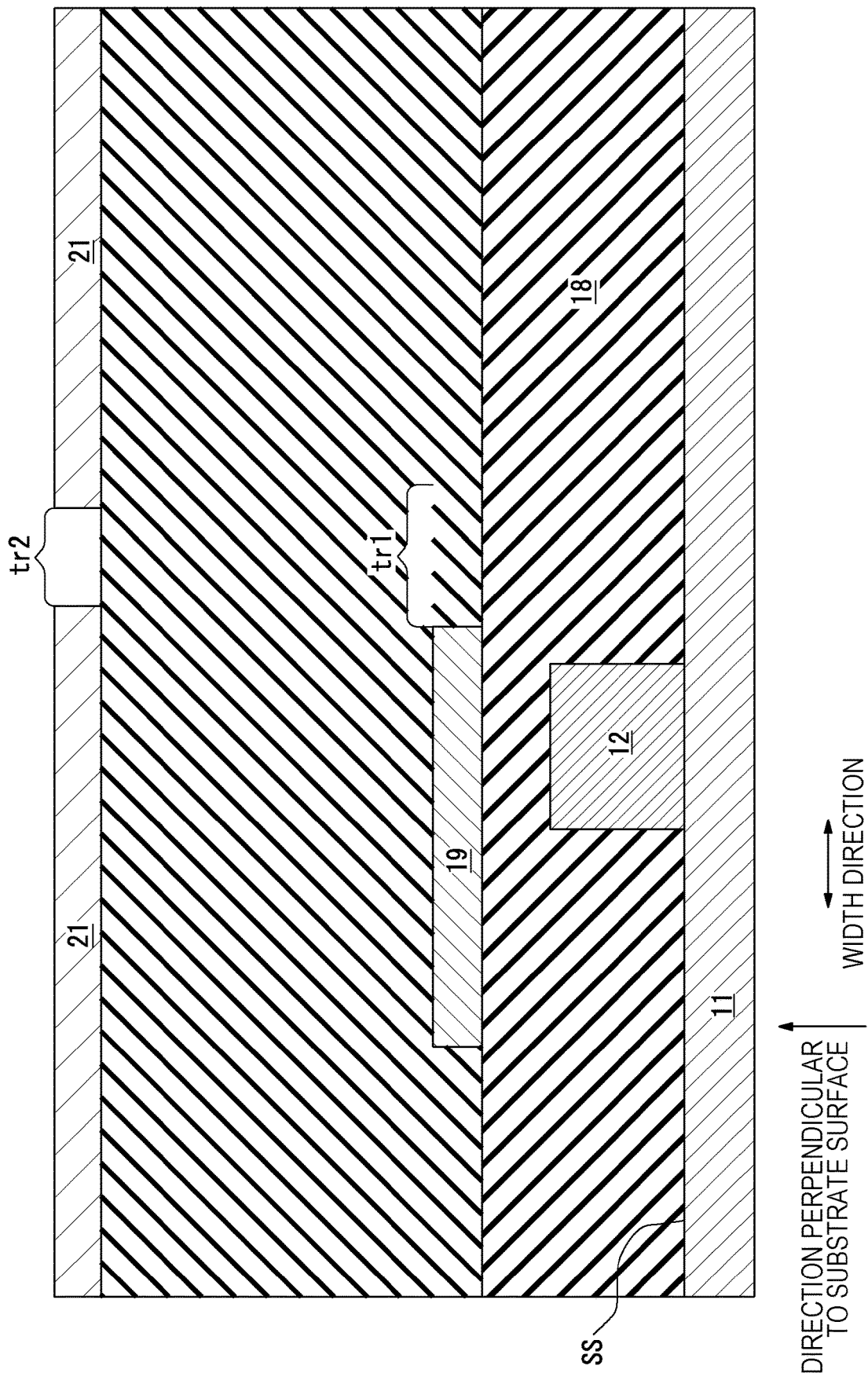
FIG. 22 is a sectional view of the intermediate product in FIG. 21 that has been cut by a plane perpendicular to a longitudinal direction of a light propagation path.

As shown in FIG. 20, as seen from the direction perpendicular to the substrate surface ss, the second mask layer 21 covers a region other than a second trench formation region tr2. As seen from the direction perpendicular to the substrate surface ss, part of the second trench formation region tr2 or the entire second trench formation region tr2 overlaps at least part of the first trench formation region tr1. For example, part of the second trench formation region tr2 overlaps the entire first trench formation region tr1. Alternatively, as shown in FIGS. 21 and 22, the entire second trench formation region tr2 may overlap part of the first trench formation region tr1.

Figure 23:
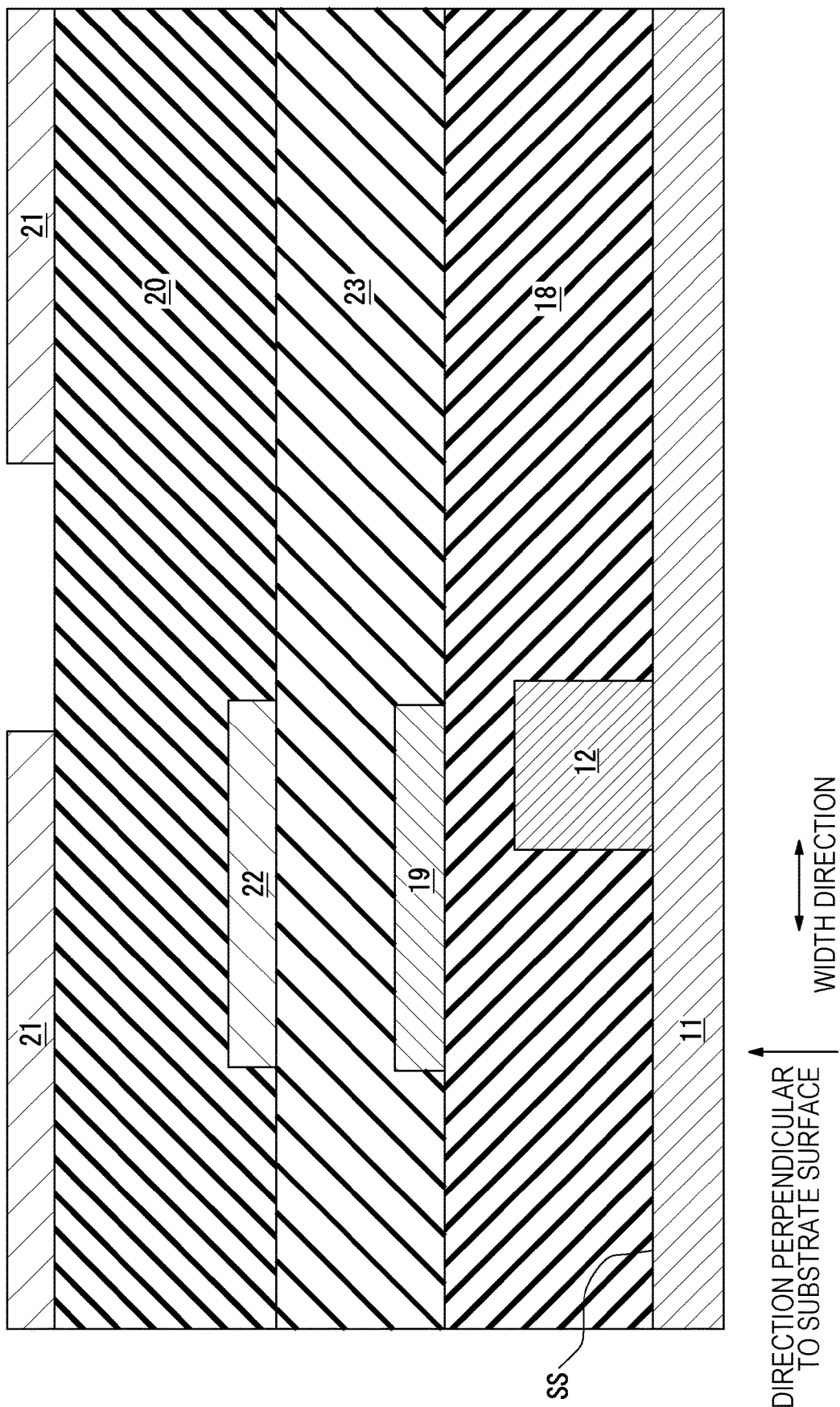
FIG. 23 is a sectional view, formed by a cutting plane perpendicular to the longitudinal direction, of a state in which an intermediate mask layer and an intermediate insulator have been formed in a modification of the manufacturing process of the nonreciprocal waveguide in FIG. 1.

Note that, as shown in FIG. 23, an intermediate mask layer 22 may be disposed between the first mask layer 19 and the second mask layer 21. One or a plurality of intermediate mask layers 22 may be disposed. An intermediate insulator 23 may be disposed between the first mask layer 19 and the intermediate mask layer 22. A method of forming the intermediate insulator 23 and a method of forming the intermediate mask layer 22 may be similar to the method of forming the second insulator 20 and the method of forming the second mask layer 21, respectively.

Figure 24:
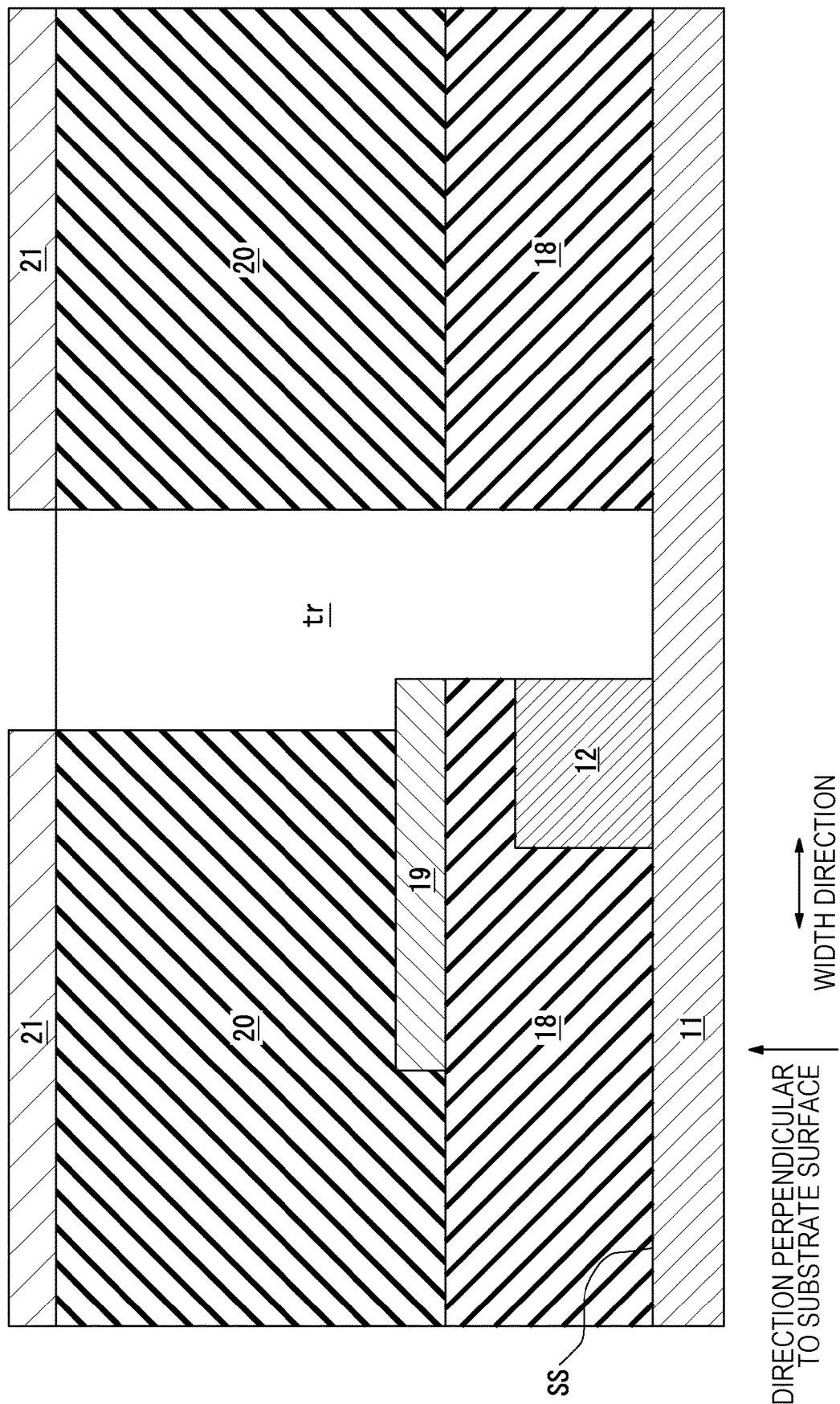
FIG. 24 is a sectional view, formed by a cutting plane perpendicular to the longitudinal direction, of a state in which a trench has been formed in the manufacturing process of the nonreciprocal waveguide in FIG. 1.

After forming the second mask layer 21, as shown in FIG. 24, for example, the trench tr is formed by performing dry etching with a $CF_4$ gas or a $CHF_3$ gas, and by removing regions of the first insulator 18 and the second insulator 20 that are not covered by the second mask layer 21 and the first mask layer 19.

Figure 25:
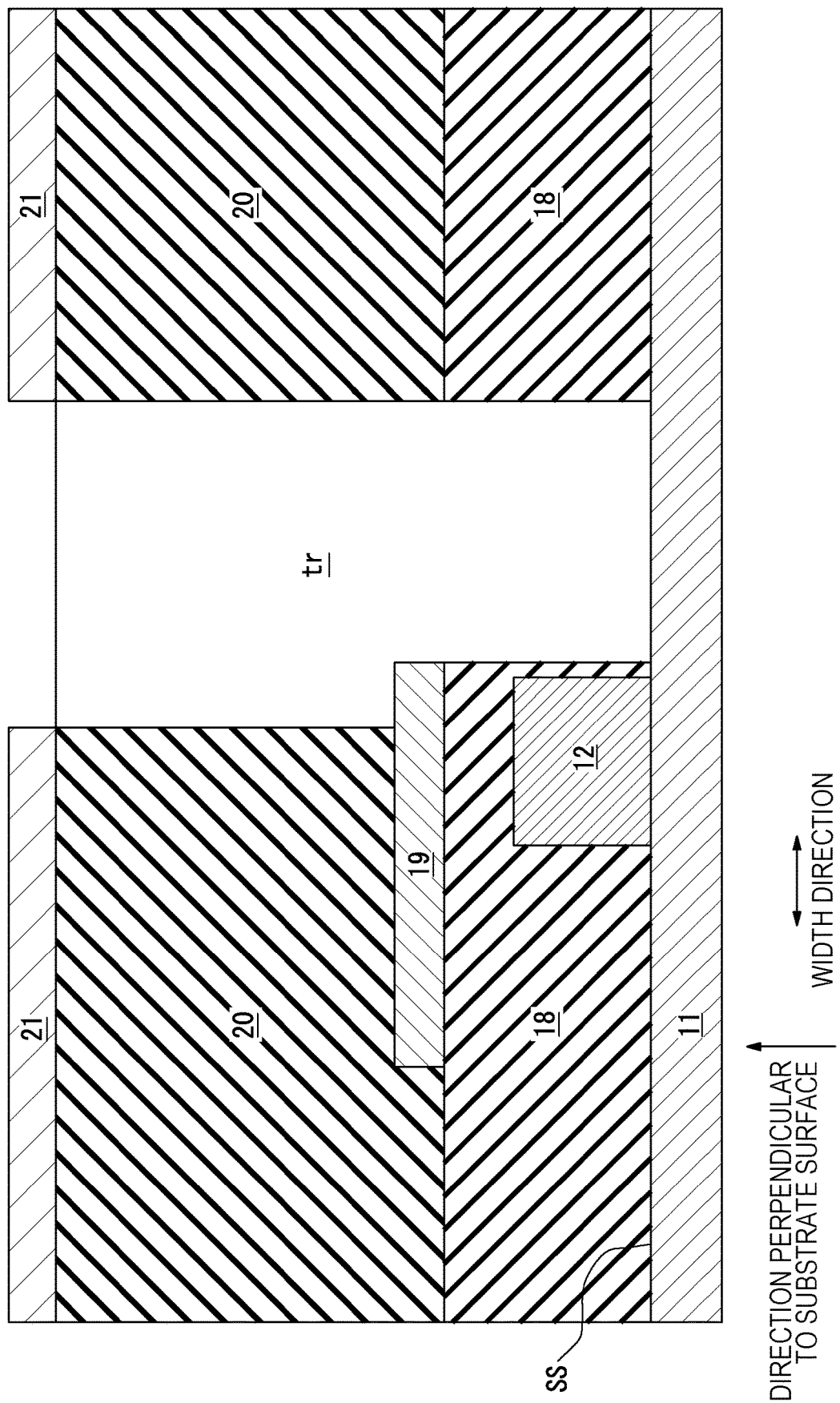
FIG. 25 is a sectional view, formed by a cutting plane perpendicular to the longitudinal direction, of a state in which a trench has been formed in the manufacturing process of the nonreciprocal waveguide in FIG. 9.
Figure 26:
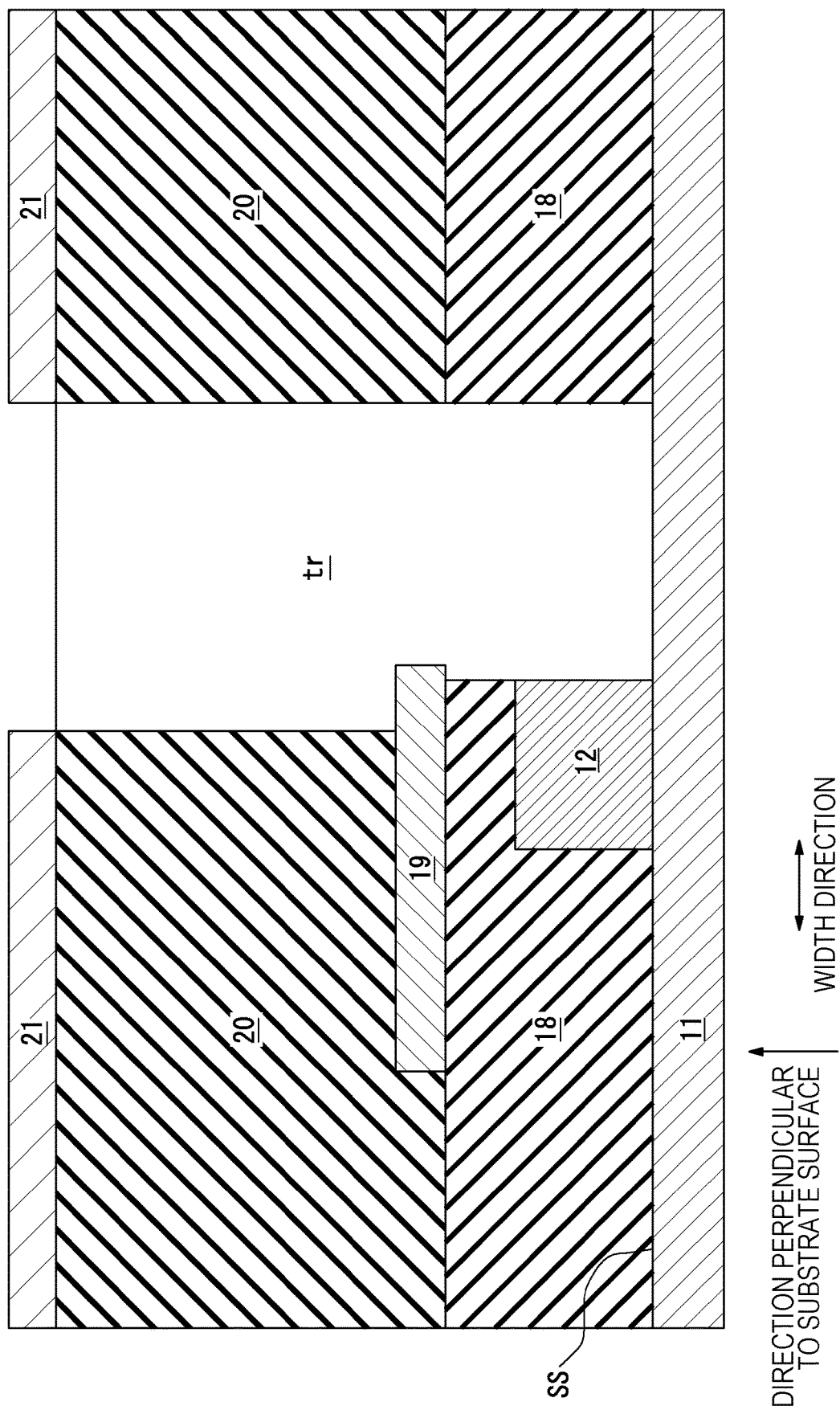
FIG. 26 is a sectional view, formed by a cutting plane perpendicular to the longitudinal direction, of a state in which a first insulator adjacent to a trench at the light propagation path of an intermediate product in FIG. 25 has been removed.

As described above, in the structure shown in FIGS. 17 and 22 in which the first mask layer 19 is disposed beyond an end surface of the light propagation path 12 and covers the light propagation path 12 as seen from the direction perpendicular to the substrate surface ss, the first insulator 18 may remain between the light propagation path 12 and the trench tr as shown in FIG. 25. The first insulator 18 that is positioned between the trench tr and the light propagation path 12, that is, positioned adjacent to the trench tr at the light propagation path 12 may be removed by fluorinated acid to expose the light propagation path 12 to the inside of the trench tr as shown in FIG. 26.

After forming the trench tr, the magnetic member 13 is formed inside the trench tr. The magnetic member 13 may be formed inside the trench tr by any method. The formation of the magnetic member 13 is described below by a plurality of formation methods as examples.

Figure 27:
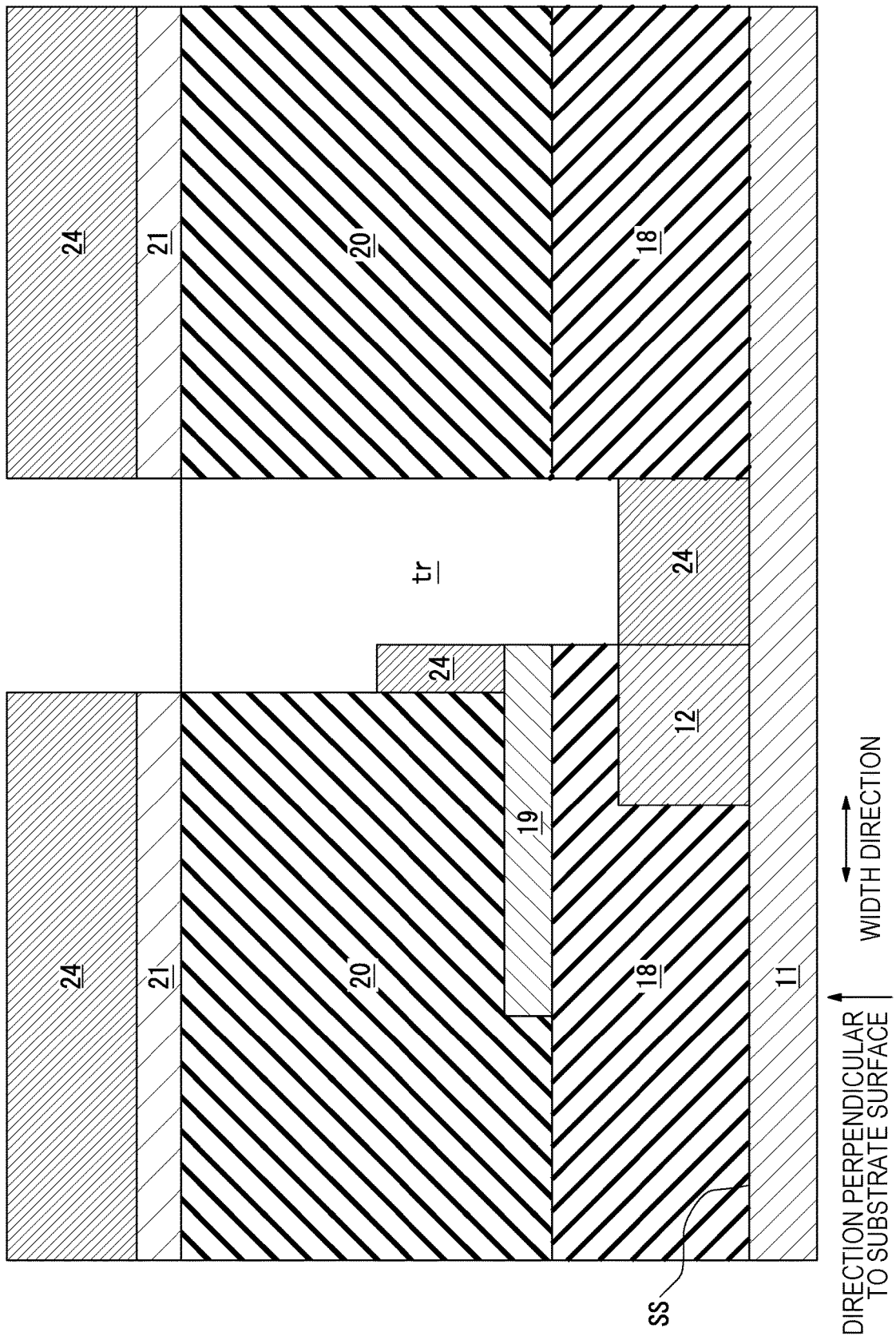
FIG. 27 is a sectional view, formed by a cutting plane perpendicular to the longitudinal direction, of a state in which a magnetic material has been deposited after forming the trench in the manufacturing process of the nonreciprocal waveguide in FIG. 1.
Figure 28:
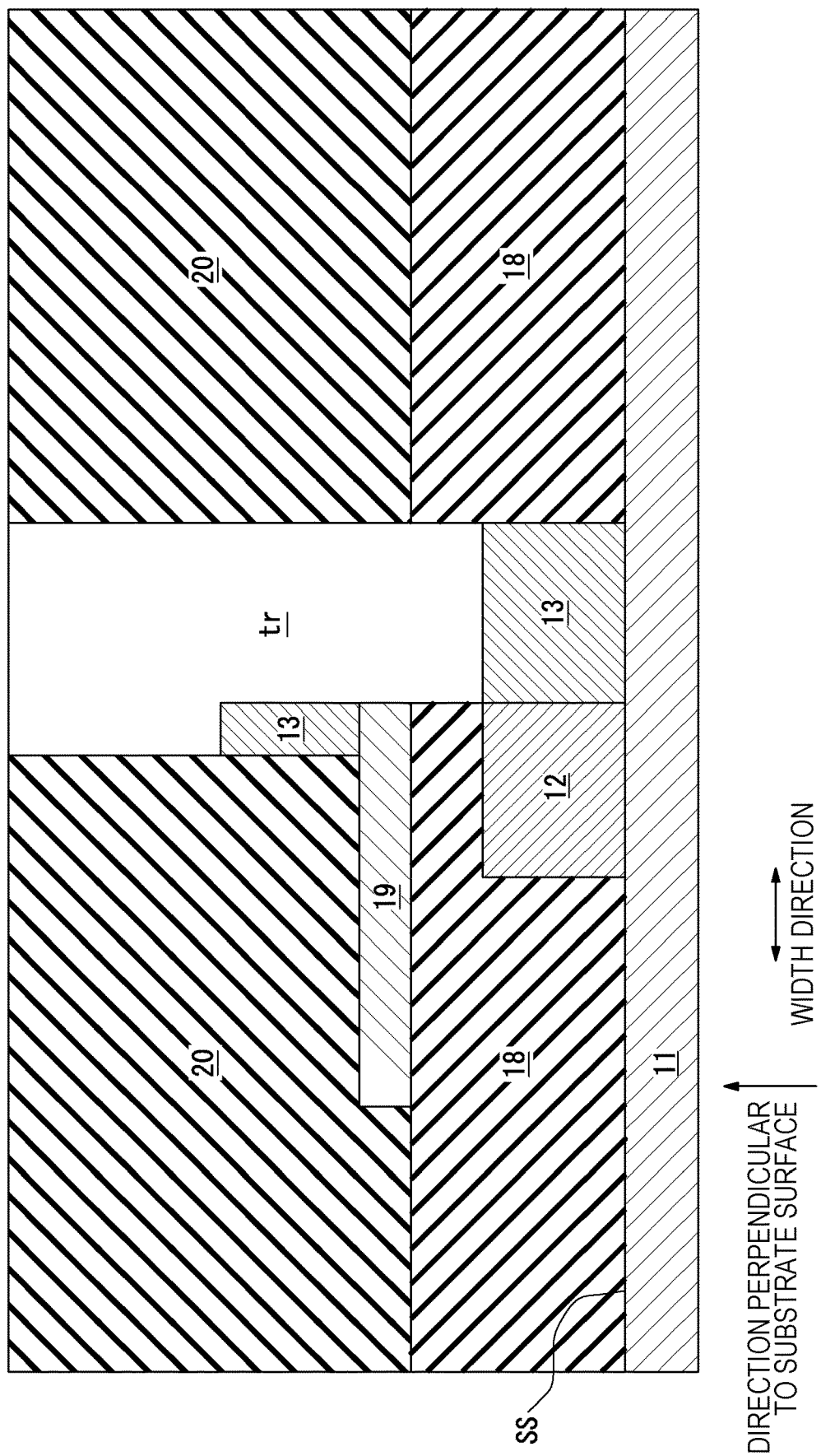
FIG. 28 is a sectional view, formed by a cutting plane perpendicular to the longitudinal direction, of a state in which a lift-off has been performed in an intermediate product in FIG. 27.
Figure 29:
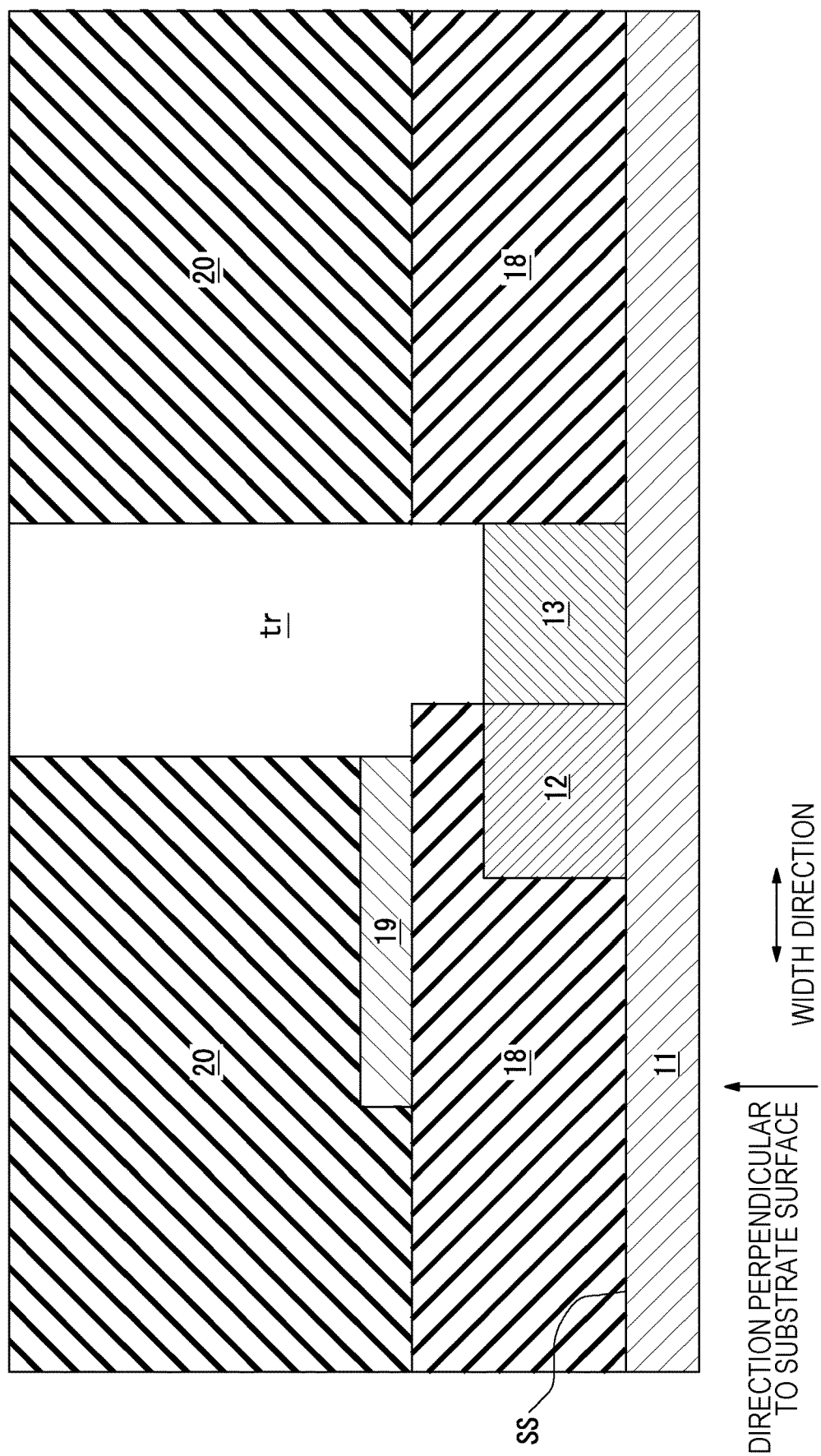
FIG. 29 is a sectional view, formed by a cutting plane perpendicular to the longitudinal direction, of a state in which a lift-off has been performed based on a modification in the intermediate product in FIG. 27.

In a first method, as shown FIG. 27, a magnetic material 24 is deposited by, for example, sputtering or evaporation from a side of the second mask layer 21 opposite to the substrate 11. After depositing the magnetic material 24, as shown in FIG. 28, the magnetic material 24 that covers regions other than the second mask layer 21 is formed as the magnetic member 13 by lift-off. The lift-off may be performed by, for example, removing the magnetic material 24 on the second mask layer 21 together with the second mask layer 21 by using a material in which the second mask layer 21 is soluble. Note that, when the material is a material in which the first mask layer 19 is also soluble, the magnetic material 24 on the first mask layer 19 is also removed as shown in FIG. 29.

Figure 30:
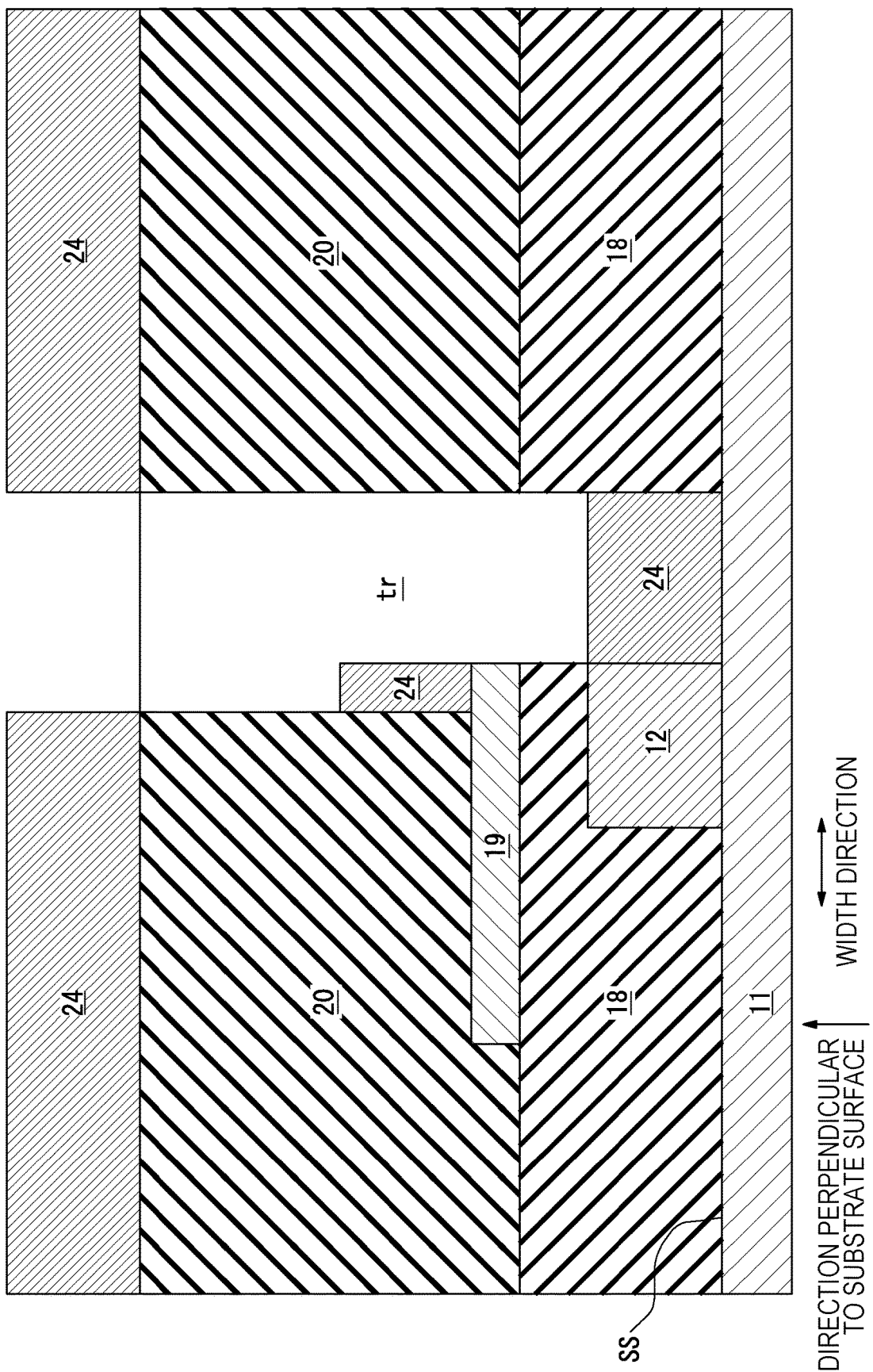
FIG. 30 is a sectional view, formed by a cutting plane perpendicular to the longitudinal direction, of a state in which, after forming the trench, the second mask layer has been removed and then the magnetic material has been deposited in the manufacturing process of the nonreciprocal waveguide in FIG. 1.
Figure 31:
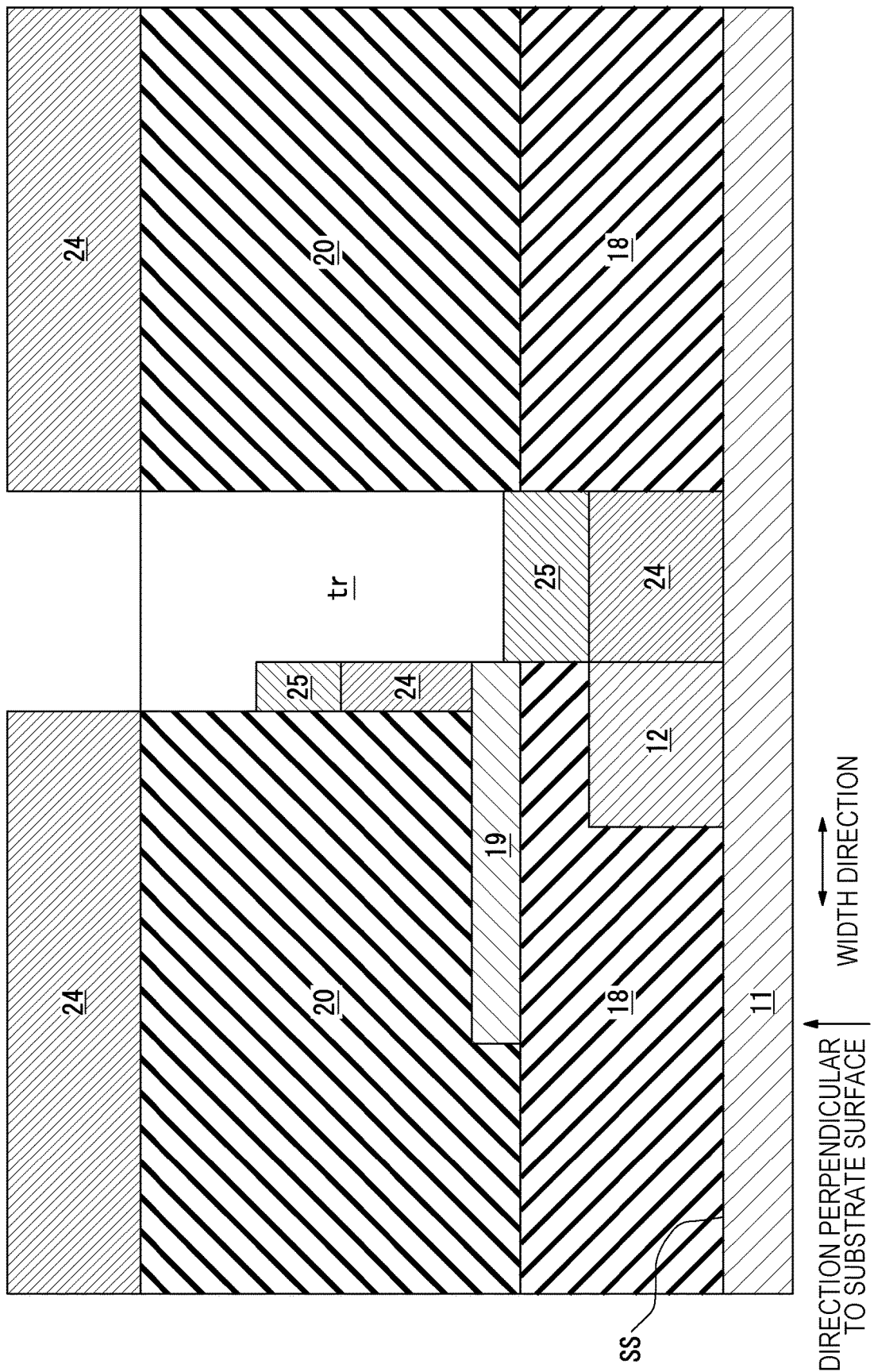
FIG. 31 is a sectional view, formed by a cutting plane perpendicular to the longitudinal direction, of a state in which a third mask layer has been formed in an intermediate product in FIG. 30.
Figure 32:
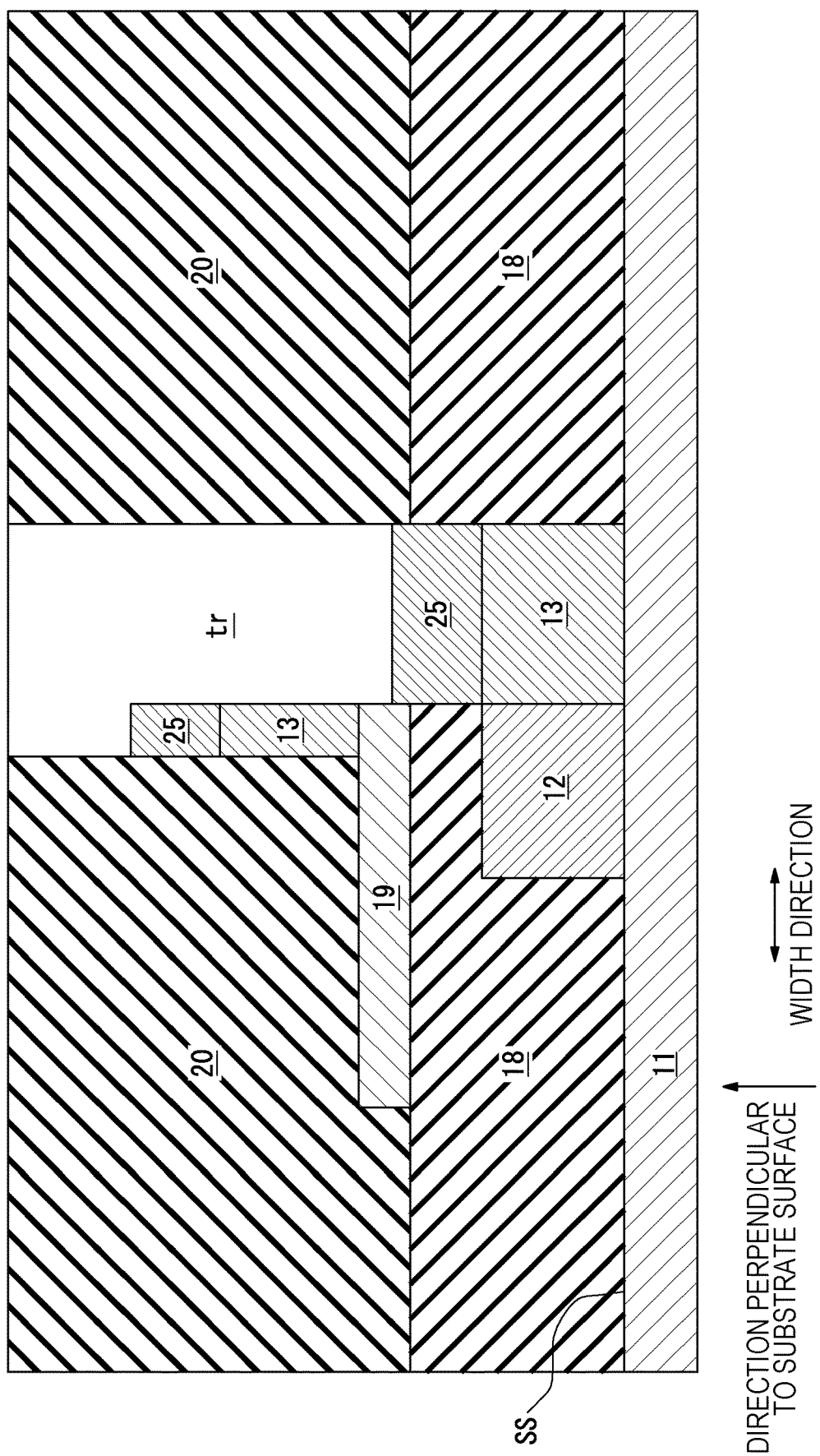
FIG. 32 is a sectional view, formed by a cutting plane perpendicular to the longitudinal direction, of a state in which etching has been performed in the intermediate product in FIG. 31.

In a second method, the second mask layer 21 is removed. The second mask layer 21 may be removed by using, for example, a material in which the second mask layer 21 is soluble, or $O_2$ plasma. After removing the second mask layer 21, as shown in FIG. 30, a magnetic material 24 is deposited by, for example, sputtering or evaporation from a side of the second insulator 20 opposite to the substrate 11. After depositing the magnetic material 24, for example, a material that is the same as the material of the first insulator 18 and the second insulator 20 is deposited by, for example, sputtering or evaporation. By masking the material deposited inside the trench tr with a resist or the like and etching the masked material, as shown in FIG. 31, a third mask layer 25 is formed on the magnetic material 24 deposited inside the trench tr. After forming the third mask layer 25, the magnetic material 24 that is situated outside the range that is covered by the third mask layer 25 is removed by etching, and, as shown in FIG. 32, the magnetic material 24 deposited inside the trench tr is formed as the magnetic member 13.

Figure 33:
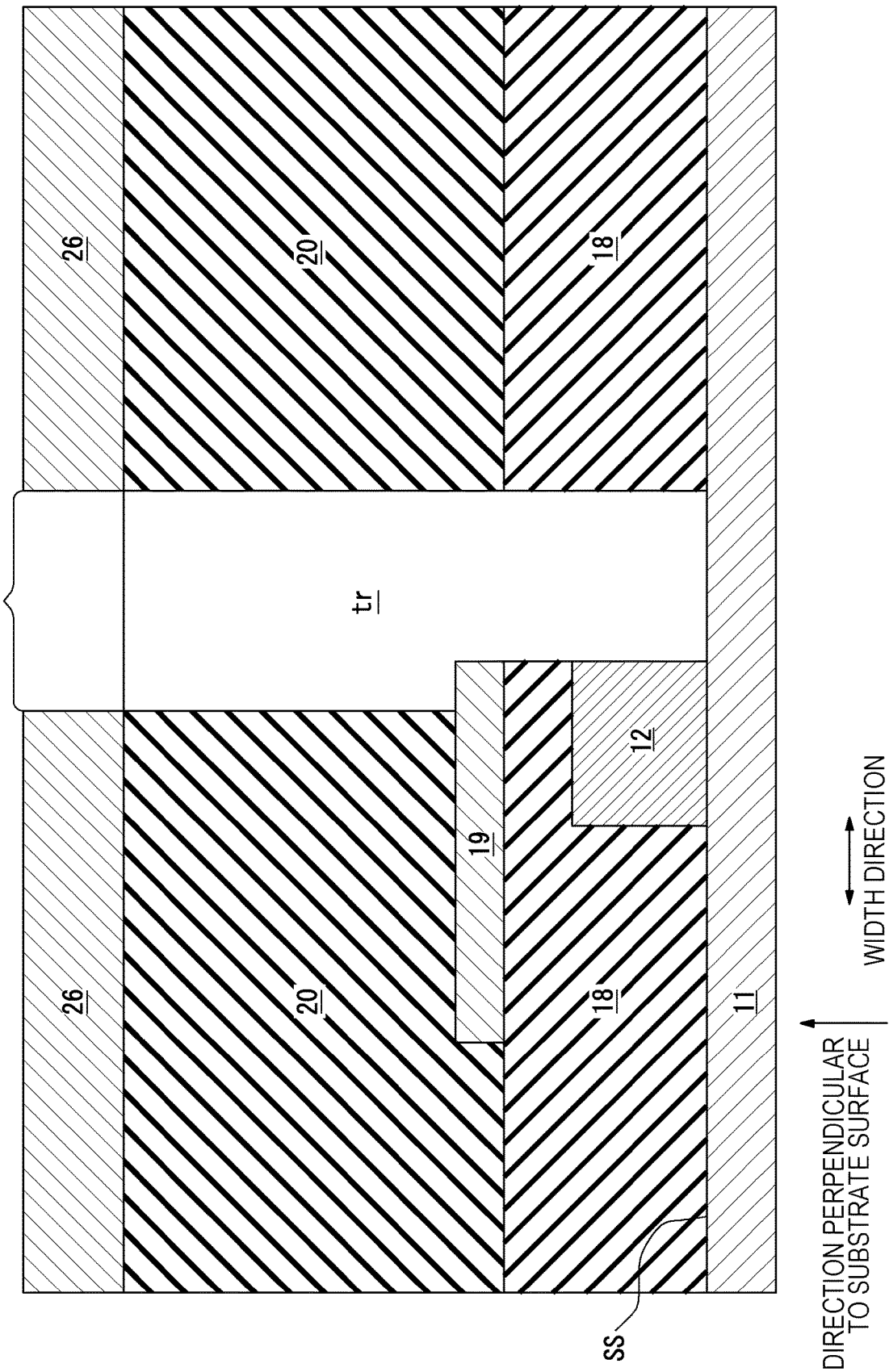
FIG. 33 is a sectional view, formed by a cutting plane perpendicular to the longitudinal direction, of a state in which, after forming the trench, the second mask layer has been removed and then a fourth mask layer has been formed in the manufacturing process of the nonreciprocal waveguide in FIG. 1.
Figure 34:
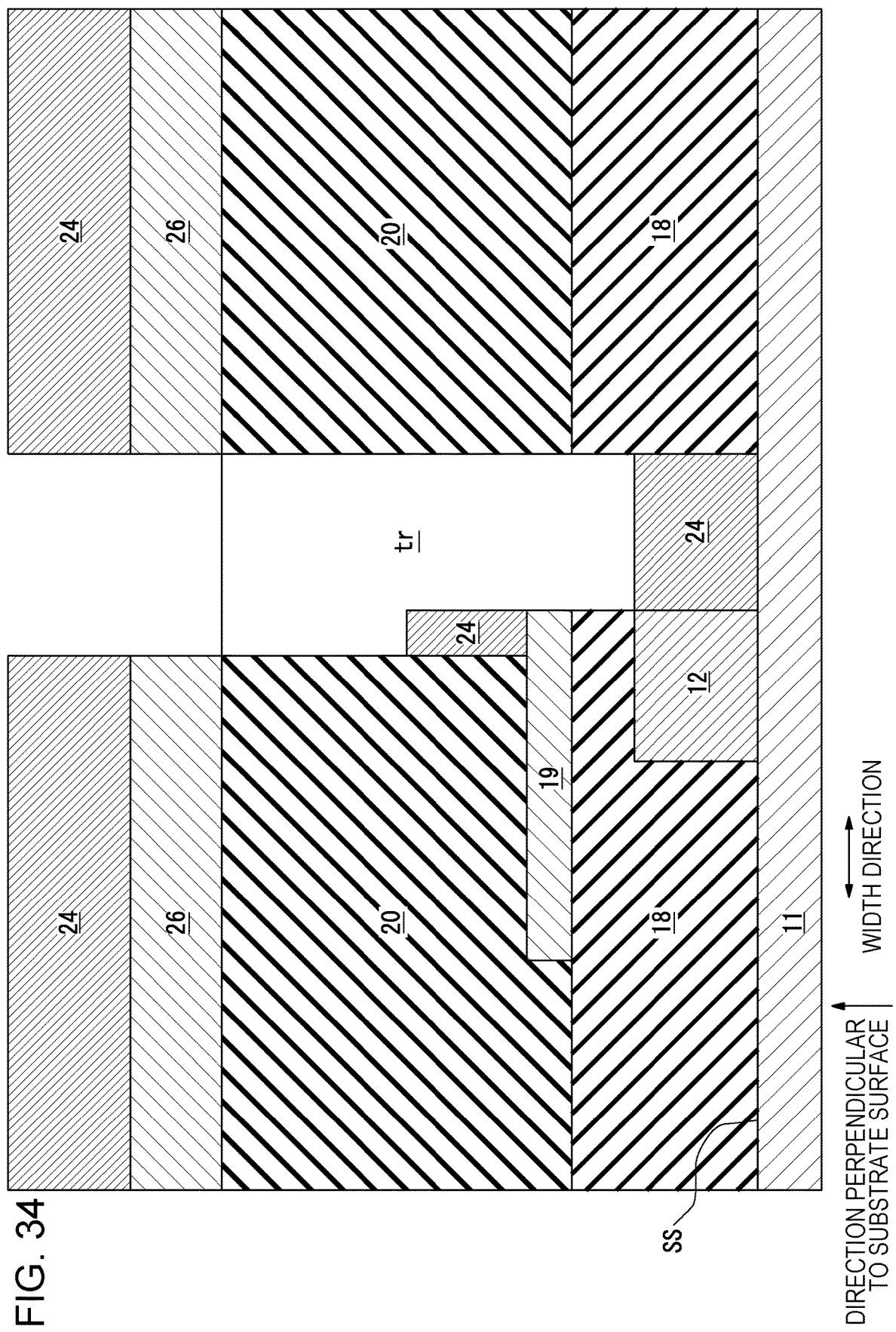
FIG. 34 is a sectional view, formed by a cutting plane perpendicular to the longitudinal direction, of a state in which a magnetic material has been deposited in an intermediate product in FIG. 33.
Figure 35:
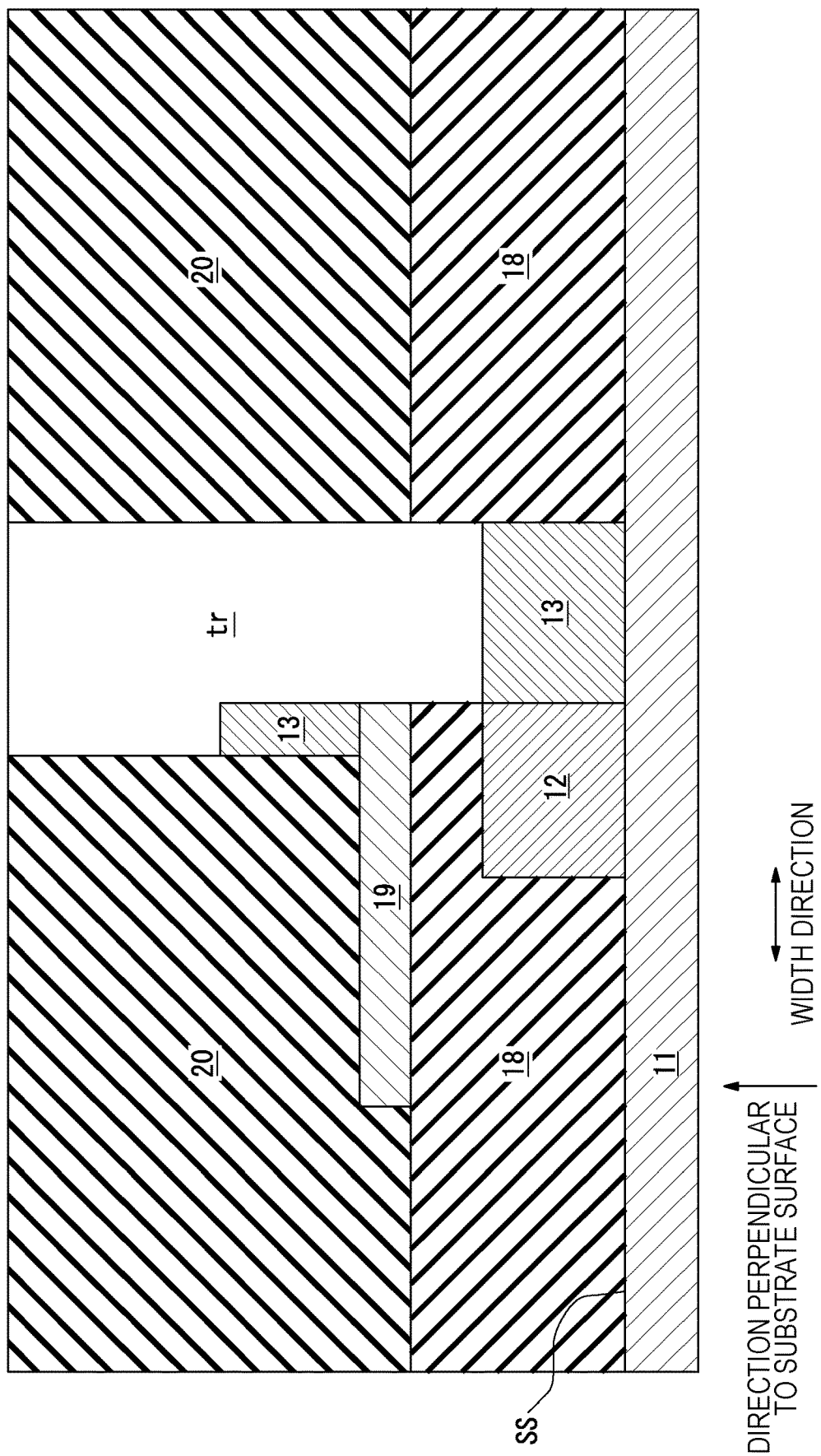
FIG. 35 is a sectional view, formed by a cutting plane perpendicular to the longitudinal direction, of a state in which a lift-off has been performed in the intermediate product in FIG. 34.

In a third method, the second mask layer 21 is removed. The second mask layer 21 may be removed by the removal method applied to the second method. After removing the second mask layer 21, as shown in FIG. 33, while covering the second insulator 20 by lithography by coating the second insulator 20 with a resist, a fourth mask layer 26 having a second trench formation region tr2 that is open is formed. After forming the fourth mask layer 26, as shown in FIG. 34, a magnetic material 24 is deposited by, for example, sputtering or evaporation from a side of the fourth mask layer 26 opposite to the substrate 11. After depositing the magnetic material 24, as shown in FIG. 35, the magnetic material 24 that covers regions other than the fourth mask layer 26 is formed as the magnetic member 13 by lift-off. The lift-off may be performed by, for example, removing the magnetic material 24 on the fourth mask layer 26 together with the fourth mask layer 26 by using a material in which the fourth mask layer 26 is soluble.

Figure 36:
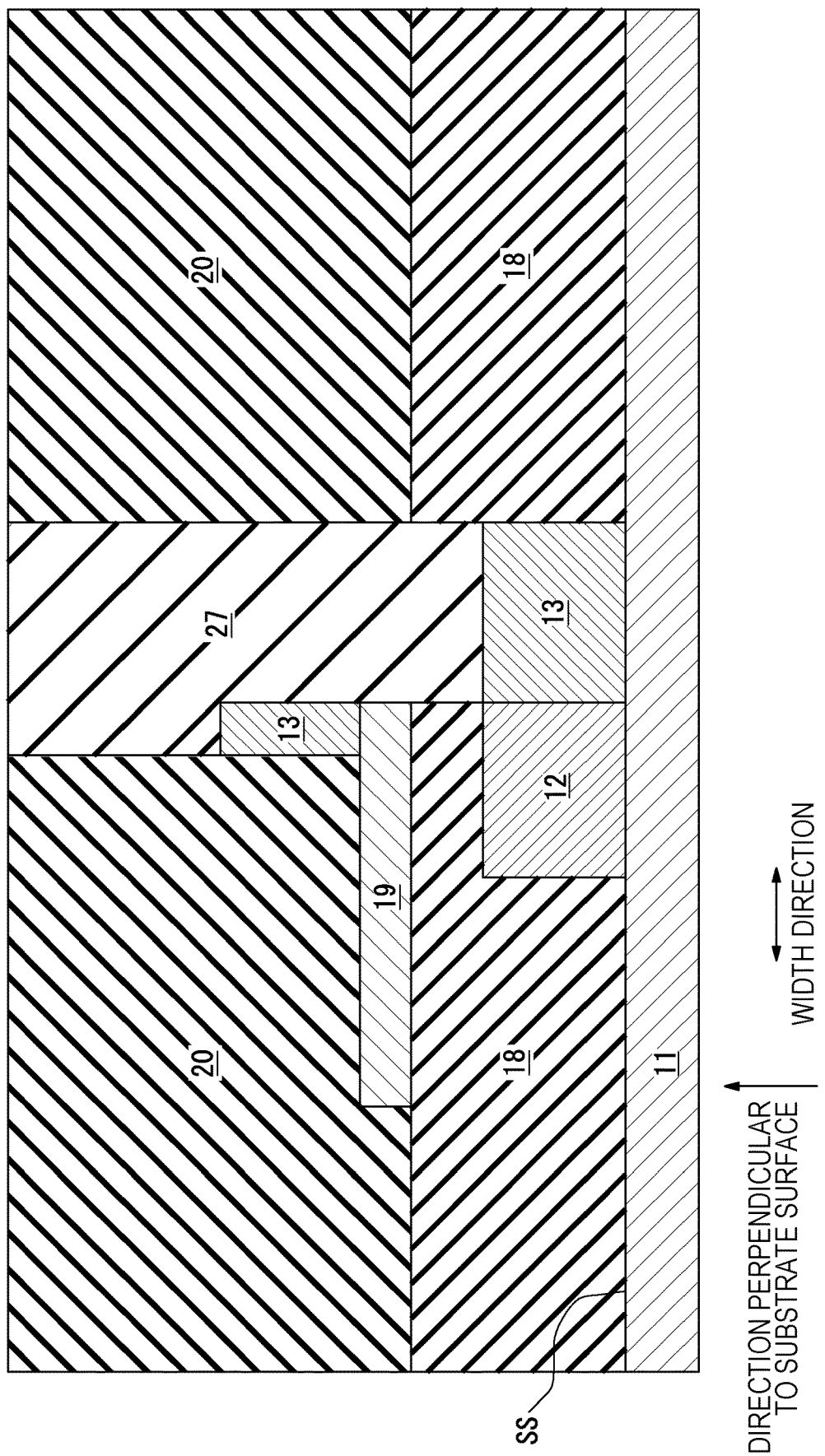
FIG. 36 is a sectional view, formed by a cutting plane perpendicular to the longitudinal direction, of a state in which, after forming the magnetic member in the trench, the trench has been refilled with a third insulator in the manufacturing process of the nonreciprocal waveguide in FIG. 1.
Figure 37:
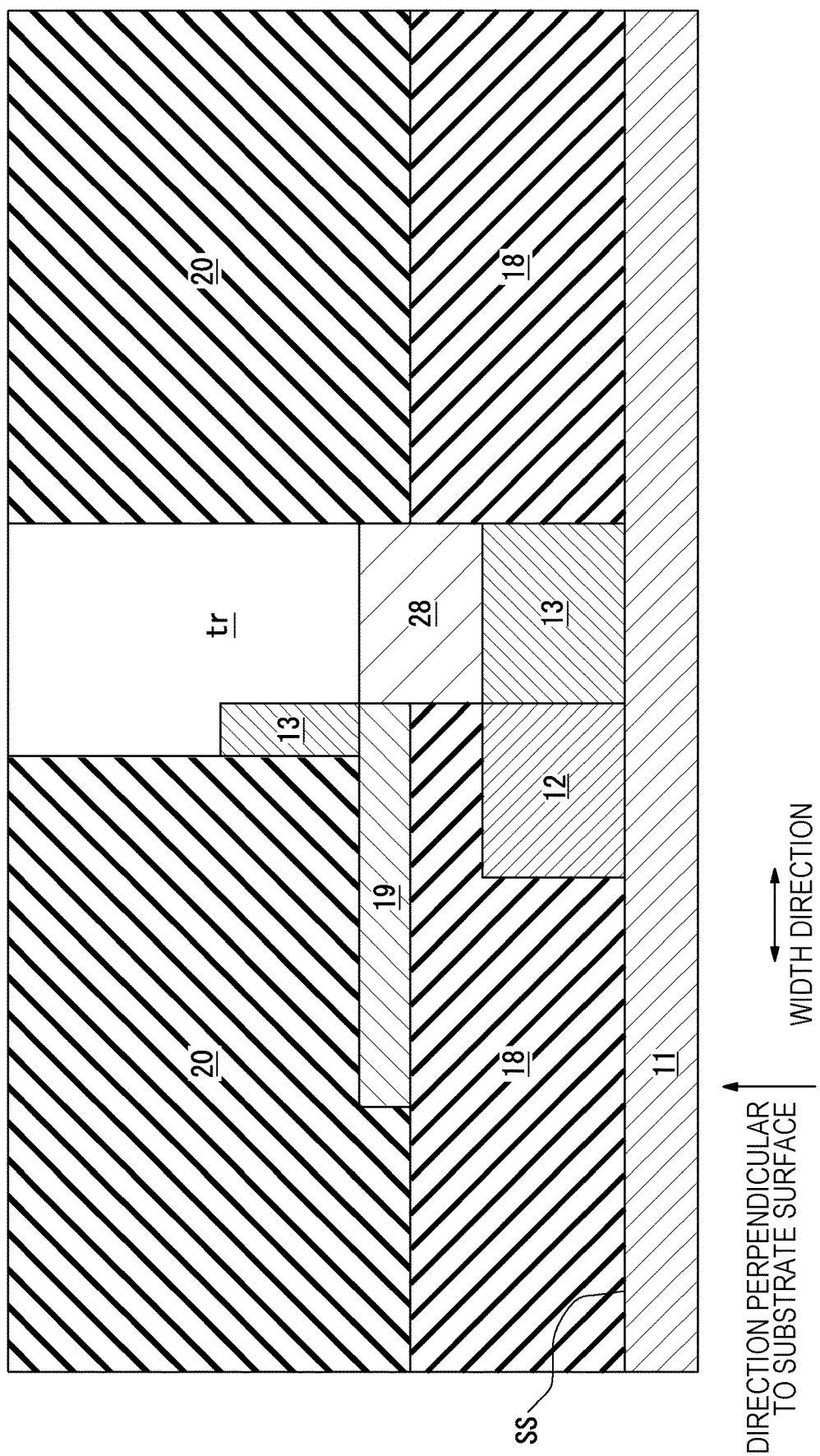
FIG. 37 is a sectional view, formed by a cutting plane perpendicular to the longitudinal direction, of a state in which, after forming the magnetic member in the trench, part of the trench is refilled with a ferromagnetic material in the manufacturing process of the nonreciprocal waveguide in FIG. 1.

After forming the magnetic member 13 inside the trench tr, as shown in FIG. 36, the trench tr may be refilled by depositing a third insulator 27 by applying, for example, CVD from a side of the magnetic member 13 inside the trench tr opposite to the substrate 11. Alternatively, after forming the magnetic member 13 inside the trench tr, as shown in FIG. 37, part of the trench tr may be refilled by depositing a ferromagnetic material 28 by applying, for example, sputtering or evaporation from a side of the magnetic member 13 inside the trench tr opposite to the substrate 11. After depositing the ferromagnetic material 28, the trench tr may be refilled with the third insulator 27. The nonreciprocal waveguide 10 is manufactured by refilling the trench tr.

Figure 38:
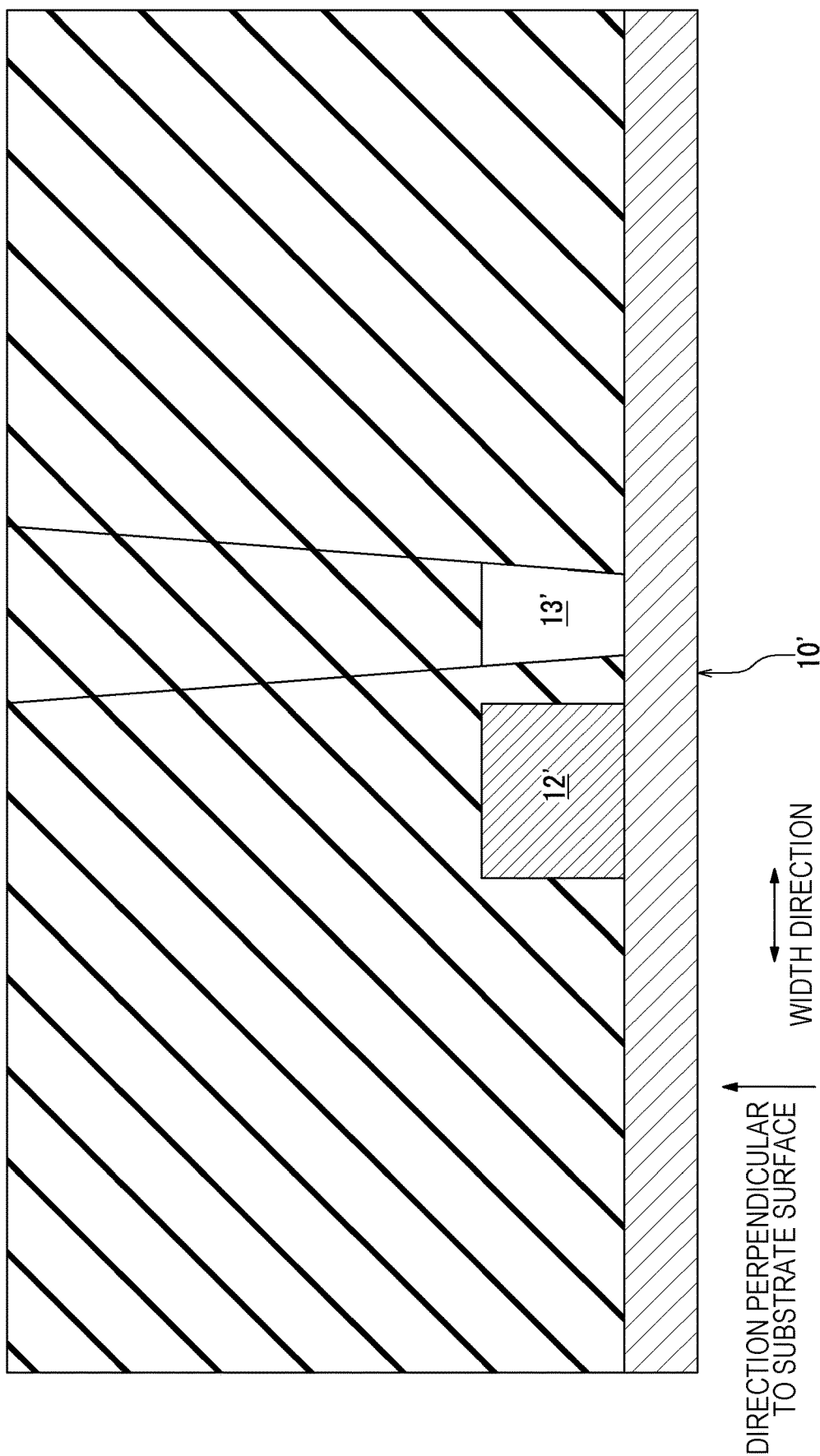
FIG. 38 is a sectional view of a nonreciprocal waveguide without a mask, which has been cut by a plane perpendicular to a longitudinal direction of a light propagation path.

The nonreciprocal waveguide 10 of the embodiment having the structure above includes the mask 15 that, inside the insulating layer 14, is positioned further away than the light propagation path 12 from the substrate 11. As seen from the direction perpendicular to the substrate surface ss, the mask 15 overlaps at least part of the light propagation path 12 in the width direction from a side of the light propagation path 12 opposite to the magnetic member 13 in the width direction, and is positioned in at least a range in which the magnetic member 13 is positioned in the longitudinal direction. In a semiconductor process such as that described above, when forming a deep trench, a side wall of the trench may become tapered. Therefore, in a nonreciprocal waveguide 10' that does not include a mask 15, as shown in FIG. 38, the precision of disposing a magnetic member 13' in a width direction with respect to a light propagation path 12' is reduced. Regarding the reduction in the precision, since, in the nonreciprocal waveguide 10 having the structure above, the mask 15 that is positioned closer to the substrate 11 than the mask layer that is temporarily disposed at a topmost surface layer during manufacturing adjusts the position of formation of the magnetic member 13, the magnetic member 13 can be disposed with high precision with respect to the light propagation path 12.

In the nonreciprocal waveguide 10 of the embodiment, the mask 15 is positioned closer to the substrate 11 than the central position of the thickness of the insulating layer 14 in the direction perpendicular to the substrate surface ss. Due to such a structure, the nonreciprocal waveguide 10 can increase the positional precision of the magnetic member 13 with respect to the light propagation path 12.

In the nonreciprocal waveguide 10 of the embodiment, as seen from the direction perpendicular to the substrate surface ss, the end, adjacent to the magnetic member 13, of the mask 15 in the width direction is disposed beyond the end, adjacent to the magnetic member 13, of the light propagation path 12. Due to such a structure, even if the nonreciprocal waveguide 10 is such that, in a step of forming the trench tr during manufacturing, etching is performed for forming a reverse-tapering trench tr whose width increases with decreasing distance to the substrate 11, the positional precision of the magnetic member 13 with respect to the light propagation path 12 can be increased.

In the nonreciprocal waveguide 10 of the embodiment, as seen from the direction perpendicular to the substrate surface ss, the mask 15 does not cover the end portion, adjacent to the magnetic member 13, of the light propagation path 12. Due to such a structure, even if the nonreciprocal waveguide 10 is such that, in the step of forming the trench tr during manufacturing, etching is performed for forming a tapering trench tr whose width on a side opposite to the substrate 11 increases, the magnetic member 13 can be disposed close to the light propagation path 12.

Although embodiments according to the disclosure have been described based on various drawings and examples, attention should be paid that various modifications or changes can be easily made based on the disclosure by any person skilled in the art. Therefore, it should be heeded that these modifications or changes are included in the scope of the disclosure. For example, the layout of functions or the like included in each structural portion or each step can be realtered without logical contradiction, and a plurality of structural portions, steps, or the like can be combined into one or can be divided from each other.

In the disclosure, "first", "second", etc. are identifiers for distinguishing between structures in question. The structures distinguished by "first", "second", etc. in the disclosure can have their ordinal numbers interchanged. For example, the first mask layer and the second mask layer can have their indicators "first" and "second" interchanged. The indicators are interchanged at the same time. Even after the indicators have been interchanged, the structures are distinguished from each other. The indicators may be deleted. The structures whose indicators have been deleted are distinguished from each other by reference signs. The order of the structures should not be interpreted and the fact that indicators of small numbers exist should not be grounded based only on the indicators, "first", "second", etc. in the disclosure.

What is claimed is:

1. A nonreciprocal waveguide comprising:
   a substrate;
   a light propagation path that is positioned at the substrate along a substrate surface;
   a magnetic member that is positioned at the substrate along part of the light propagation path in a longitudinal direction;
   an insulating layer that is positioned at the substrate, the insulating layer containing the light propagation path and the magnetic member; and
   a mask inside the insulating layer that is positioned further away from the substrate than the light propagation path from the substrate, and
   as seen from a direction perpendicular to the substrate surface, the mask overlapping at least part of the light propagation path in a width direction from a side of the light propagation path opposite to the magnetic member in the width direction and positioned in at least a range in which the magnetic member is positioned in the longitudinal direction.

2. The nonreciprocal waveguide according to claim 1, wherein the mask is positioned closer to the substrate than to a central position of a thickness of the insulating layer in the direction perpendicular to the substrate surface.

3. The nonreciprocal waveguide according to claim 1, wherein the mask does not overlap the magnetic member as seen from the direction perpendicular to the substrate surface.

4. The nonreciprocal waveguide according to claim 1, wherein an end of the mask in the width direction adjacent to the magnetic member is disposed beyond an end of the light propagation path adjacent to the magnetic member, as seen from the direction perpendicular to the substrate surface.

5. The nonreciprocal waveguide according to claim 1, wherein the mask does not cover an end portion of the light propagation path adjacent to the magnetic member as seen from the direction perpendicular to the substrate surface.

6. The nonreciprocal waveguide according to claim 1, wherein an end surface of the mask adjacent to the magnetic member has a shape corresponding to a shape of an end surface of the magnetic member adjacent to the light propagation path, as seen from the direction perpendicular to the substrate surface.

7. An isolator comprising:
the nonreciprocal waveguide according to claim 1.

8. An optical switch comprising:
the nonreciprocal waveguide according to claim 1.

9. An optical transceiver comprising:
the nonreciprocal waveguide according to claim 1.

10. A data center comprising:
the nonreciprocal waveguide according to claim 1.

11. A nonreciprocal waveguide manufacturing method comprising:
forming a light propagation path at a substrate, the light propagation path having a longitudinal direction along a substrate surface;
depositing a first insulator and embedding the light propagation path;
forming a first mask layer on a side of the first insulator opposite to the substrate,
as seen from a direction perpendicular to the substrate surface, the first mask layer not overlapping a first trench formation region and overlapping at least part of the light propagation path in a width direction from a side opposite to one end of the light propagation path in the width direction, the first trench formation region being positioned along the light propagation path adjacently to the one end of the light propagation path at part of the light propagation path in the longitudinal direction;
depositing a second insulator and embedding the first mask layer;
forming a second mask layer on a side of the second insulator opposite to the substrate,
as seen from the direction perpendicular to the substrate surface, the second mask layer covering a region other than a second trench formation region, at least a part of the second trench formation region overlapping at least part of the first trench formation region;
forming a trench by etching the first insulator and the second insulator from a side of the second mask layer; and
forming a magnetic member in the trench.

12. The manufacturing method according to claim 11, wherein a selection ratio of a formation material of the first insulator with respect to a formation material of the first mask layer in etching for forming the trench is greater than or equal to a thickness of the first insulator with respect to a thickness of the first mask layer.

13. The manufacturing method according to claim 11, wherein the first mask layer overlaps an entirety of the light propagation path in the width direction.

14. The manufacturing method according to claim 11, wherein the first mask layer does not overlap an end portion, on a side of the one end, of the light propagation path.

15. The manufacturing method according to claim 11, comprising:
after forming the trench, removing the first insulator adjacent to the trench at the light propagation path.

16. The manufacturing method according to claim 11, comprising:
after forming the trench, depositing a magnetic material from a side of the second mask layer opposite to the substrate, and
removing the magnetic material deposited on the first mask layer or the second mask layer, the first mask layer, and the second mask layer by performing a lift-off with a material in which the first mask layer and the second mask layer are soluble.

17. The manufacturing method according to claim 11, comprising:
after forming the trench, depositing a magnetic material from a side of the second insulator opposite to the substrate with the second mask layer removed from the second insulator,
forming a third mask layer at the magnetic material that is deposited in the trench, and
removing by etching the magnetic material that is situated outside a range that is covered by the third mask layer.

18. The manufacturing method according to claim 11, comprising:
after forming the trench, forming a fourth mask layer covering the second insulator from which the second mask layer has been removed and comprising the second trench formation region that is open,
depositing a magnetic material from a side of the fourth mask layer opposite to the substrate, and
removing, together with the fourth mask layer, the magnetic material deposited on the fourth mask layer together with the fourth mask layer by performing a lift-off with a material in which the fourth mask layer is soluble.

19. The manufacturing method according to claim 11, comprising:
refilling part of the trench by depositing a ferromagnetic material from a side of the magnetic member inside the trench opposite to the substrate.

20. The manufacturing method according to claim 11, comprising:
refilling the trench by depositing a third insulator from a side of the magnetic member inside the trench opposite to the substrate.

* * * * *